United States Patent [19]

Rosenbaum et al.

[11] Patent Number: 5,731,841
[45] Date of Patent: Mar. 24, 1998

[54] HIGH PERFORMANCE DATA TUNER FOR VIDEO SYSTEMS

[75] Inventors: Glen Var Rosenbaum, Gilbert; Melvyn Engel, Scottsdale, both of Ariz.

[73] Assignee: Wavephore, Inc., Phoenix, Ariz.

[21] Appl. No.: 249,017

[22] Filed: May 25, 1994

[51] Int. Cl.$^6$ ........................................................ H04N 7/08
[52] U.S. Cl. ........................... 348/463; 348/473; 348/731; 348/467
[58] Field of Search ..................... 348/731, 461, 348/462, 464, 465, 467, 463, 473, 486

[56] References Cited

U.S. PATENT DOCUMENTS

| | | | |
|---|---|---|---|
| 5,178,637 | 1/1993 | Naimpally | 348/473 X |
| 5,243,423 | 9/1993 | DeJean et al. | 348/473 X |
| 5,327,237 | 7/1994 | Jungo et al. | 348/476 |
| 5,387,941 | 2/1995 | Montgomery et al. | 348/473 |
| 5,410,360 | 4/1995 | Montgomery | 348/473 |
| 5,461,426 | 10/1995 | Limberg et al. | 348/475 |

FOREIGN PATENT DOCUMENTS 06627  12/1994  WIPO ............................. H04N 7/08

OTHER PUBLICATIONS

Replay Comments of Wavephore, Inc. before the Federal Communications Commission, received Mar. 28, 1994.
Letter datd Dec. 9, 1993 from David Deeds, WavePhore, Inc., to Roy J. Stewart, Federal Communications Commission with attached Declarations.

Primary Examiner—John K. Peng
Assistant Examiner—Nathan J. Flynn
Attorney, Agent, or Firm—Snell & Wilmer

[57] ABSTRACT

A tuner specifically adapted for recovery of a data signal injected into a video signal and then subsequently transmitted over a television channel or cable is disclosed. The tuner includes an IF local oscillator that is phase locked to the input signal sync pulses and has filters that are designed to pass through only the data bandwidth. In addition, the circuit has a low noise figure of about 1.5 dB and a third order intercept point of +35 dBm.

15 Claims, 24 Drawing Sheets

HIGH PERFORMANCE DATA TUNER FOR VIDEO SYSTEMS

RELATED APPLICATIONS

This application is related to U.S. patent application Ser. No. 07/947,134, filed Sep. 18, 1992, (U.S. Pat. No. 5,208,595) which is a continuation-in-part of U.S. patent application Ser. No. 07/748,023, filed on Jun. 14, 1991 (U.S. Pat. No. 5,208,595). This application is also related to the following applications filed on Jun. 14, 1993: U.S. patent application Ser. No. 08/076,199 entitled Transmitting A Secondary Signal With Dynamic Injection Level Control (U.S. Pat. No. 5,559,559); U.S. patent application Ser. No. 08/076,137 entitled Timing Signals For Transmitting A Secondary Signal (U.S. Pat. No. 5,410,360); and U.S. patent application Ser. No. 08/075,888 entitled Filter By-pass For Transmitting An Additional Signal With A Video Signal. Each of these prior applications cited above is hereby incorporated by reference, abandoned is view of U.S. patent application Ser. No. 08/415,163 filed on Mar. 31, 1995.

BACKGROUND OF THE INVENTION

1. Field of the Invention

This invention relates to tuners for video systems and more particularly relates to high performance tuners for recovering data transmitted by video systems.

2. Description of the Art

Most tuners designed to receive video signals such as NTSC, PAL and SECAM format-transmitted signals are of a super heterodyne design, wherein the frequency of the video signal is shifted first from the transmitted frequency of the selected channel to a lower frequency, which is the intermediate frequency (IF). After further processing, the video signal at IF is shifted to even lower frequencies, normally to base band.

Over the years, a number of systems have been proposed for transmitting data during the active video signal. These include proposals to inject data signals into the vestigial side band at the IF such as disclosed in U.S. Pat. No. 4,958,230 to Jonnalagadda et al. and to spread data cells over multiple lines with phase inversion as in U.S. Pat. No. 5,200,822. Earlier systems such as those described in articles by King, namely in *Journal of the SMPTE*, Vol. 83, January 1974, pp. 10–13 and *IEEE Transactions on Broadcast and Television Receivers*, Vol. BTR-19, No. 4, pp. 225–30, November 1973, describe a system for injecting data at lower data rates on alternative lines. These systems have a number of drawbacks such as low data rates, visually perceptible aspects caused by the data in the video signal and technically demanding systems for implementing the injection into the video signal.

The assignee of this application has developed a system as shown in U.S. patent application Ser. No. 07/748,023, and U.S. patent application Ser. Nos. 07/947,134, 08/076,199, 08/076,137 and 08/075,888, for injecting data into the video base band signal at low levels of injection. This data is scrambled and injected between the chroma information and the upper end of the video bandwidth signal after filtering the portion of the base band video spectrum where the data will be injected. Preferably, in the encoder system developed by WavePhore, the base band data is band limited to about 300 KHz, is lower single side band modulated by a data carrier to a data band in the base band video and injected only during the active line of the base band video signal. The data carrier has a frequency at about the upper edge of the video bandwidth at the base band. The data carrier is modulated by the data preferably by bi-phase modulation or by QAM modulation using lines 23 through 261 during the active video interval so that the data is injected into the data band of the active video. For example, in a standard NTSC signal, the data is injected by a data carrier at 4.19 Megahertz at a low level of injection. Preferably also a data carrier burst is inserted at the start of each horizontal line on which data is transmitted as described in U.S. patent application Ser. Nos. 947,134 and 076,137 with a predetermined number of data symbol cells in each line of the active video. The injection level is selected so that artifacts from the data cannot be visually discerned by viewers at a television tuner receiving the signal combined with the data. In addition, to reduce the chance of artifacts, the data is rasterized at the horizontal scanning rate and is frequency interleaved by using a data carrier at an odd, non-integral quarter multiple of the horizontal scanning rate to frequency interleave the data with the luminance and chrominance portions of the video signal. Typically, the injection level of the data is 50 millivolts peak-to-peak. This level is typically about 65 dB below the maximum level of the video signal. The combined video and data signals are subsequently super heterodyned for transmission in the assigned channel band of the video signal.

This low level of injection causes several problems in designing a tuner for receiving the transmitted video signal in the channel band—particularly at locations remote from the transmitter tower transmitting the combined video/data signal. Among these problems is too high a level of injection relative to the video signal shows up as an artifact on the received video image. Too low an injection level leads to difficulty in detecting the injected data above the noise floor at locations remote from the transmitter tower.

Yet a further factor is not only the relative level of injection of the data signal to the video signal but the magnitude of the video signal. Typical received television signals have a power input range from about −10 dBm to −70 dBm. At least some discernable video signals are detectable at −83 dBm at the outskirts of the television reception area. This is, of course, a broad dynamic range of received signal levels of 60 dB to 70 dB. Conventional video tuners, while adapted to handle this broad dynamic range of signals, cannot recover data injected at low levels in a weak signal detected at the tuner. With a constant noise floor, the signal to noise ratio will vary as the input power of the received signal varies. The power of the injected data signal is very close to the noise floor for low power input video signals. Therefore, while the receiver noise figure may not be significant for the video, it is critical for data extraction. Tuners used for video detection commonly have front end adjustable attenuation or AGC circuitry. This degrades the overall noise figure and may prevent data reception.

ANALYSIS FOR THE APPLICATION

To improve the tuner, the applicant has taken measurements of actual received signals and modeled the problems associated with those signals. Signal to noise ratio evaluation of the input signal is of course a consideration. Measurements of typical signal to noise ratios at the input of a video tuner in the normal service area of a television station (i.e., from about −20 dBm to −60 dBM) shows input signal to noise ratios for a dataless signal at about 26 to 28 dB. It is only when the received video signal strength drops below −60 dBm that the signal to noise ratio substantially decreases. Of course, the tuner injects additional noise and therefore can decrease the overall signal to noise ratio by about 14 dB typically.

FIGS. 1–3 show the fundamental problem of recovery of data with such low signal to noise ratios. FIG. 1 shows measurement of the power spectrum of a received video signal by a spectrum analyzer of the combined signal of data injected into an NTSC video signal according to the methods described above. The video carrier 2 can be seen as the peak amplitude (at 0 dB). The chroma portion of the spectrum is primarily in the lobe 3, at about −50 dB at the peak, relative to the video carrier. Oval 4 shows the data information energy is at about −65 dB on average. The data energy is at between about 3.9–4.2 MHz above the video carrier for an NTSC signal. The luminance information lies mostly between the video carrier 2 and the lobe (chroma portion) 3.

Further, FIG. 1 shows the audio carrier as a spike 7 at the far upper end of the signal bandwidth at 4.5 MHz above the video carrier. This audio carrier is relatively powerful (only a few dB down from the video carrier) and can readily blanket the data portion near the audio carrier.

FIG. 2 shows a close-up of the video spectra data with the chroma portion 3 on the left-hand side and the data IF portion 4 on the right-hand side at a relatively high signal to noise ratio (36 dB). Given how close the data is to the chrominance information, data recovery is difficult—particularly as the signal to noise ratio deteriorates. FIG. 3 shows a situation where the video information power-input is low (at about −50 dBm) and the signal to noise ratio is only 16 dB. In this situation, the noise 6 has nearly the same power as the data signal 4 in the data band of about 3.9–4.2 MHz. Also, it should be remembered, to a data tuner, the chroma and audio portions in the video signal are essentially noise and substantially interfere with data recovery, particularly when the signal to noise ratio is low. Therefore, at low input power levels, the chroma and audio may substantially mask the data information contained within the combined signal, making detection difficult.

FIG. 4 shows certain curves relating to a model of the signal to noise ratio performance of a typical tuner and further demonstrates the inadequacies of the typical video tuner. This model is based primarily upon the input signal noise at the antenna plus the thermal noise of the tuner.

In particular, FIG. 4 shows a plot of the signal to noise ratio based upon the power-input of the received signal in dBm or dBmv versus the power-output at the output of the IF section of the tuner in terms of dBm. Curve 10 shows the power-input versus power-output curve for data injected at a level of 50 mV peak-to-peak as described in U.S. patent application Ser. No. 07/715,920, and U.S. patent application Ser. No. 07/947,134. On the other hand, curve 12 shows the power-input versus power-output curve of a data signal injected at a level of 25 mV peak-to-peak. Curve 14 shows a thermal noise floor of a typical tuner having a noise figure of about 13 dB while curve 16 shows the theoretical limit of a system having a noise figure of 0 dB. Curve 18 shows the effects of amplification on the input noise and curve 20 shows the total noise of a typical system having a noise figure of 13 dB. As can be seen in FIG. 4, the amplified input noise of this typical system becomes significant at a power-input of about −38 dBm. Thus the characteristic total noise curve 20 is substantially constant for power inputs of below about −50 dBm and has a substantially constantly increasing noise at power levels of above about −30 dBm. Therefore, signal to noise level at input signals above −30 dBm will level off at input power levels beyond this point.

Nonetheless, as can be seen in FIG. 4, the thermal noise of the tuner has the predominant effect on the signal to noise ratio as the input power level decreases below −38 dBm. At −50 dBm, where thermal noise predominates, the signal to noise ratio for the data is 12 dB, while at −66 dBm, the thermal noise equals the data input power so that the signal to noise ratio is 0 dB. Thus, at data power input levels of −66 dBm, the typical receiver is unable to detect data. Practical tests show that for decoding without high bit error rates, the data should preferably be at least 10 dB above the total noise level.

Thus, FIG. 4 shows that the type of receivers described in the above-mentioned patent applications have a service area limited to within the −50 dBm service area of the transmitter. Such limited geographical coverage is undesirable because strong signal detection of the NTSC signal from the transmitter occurs with power inputs at −60 dBm typically. Therefore, it is a first object of this invention to improve the recovery of data signals by providing data recovery without significant numbers of data error at least with received signal strengths as low as about −60 dBm.

In addition to problems with noise, intermodulation and particularly third order intermodulation causes severe problems in detection of the data from the video signal by limiting the maximum power input to the system. The third order intermodulation results from mixing of two frequencies, $F_1$ and $F_2$, in nonlinear components such as junctions in semiconductors with the third order products being equal to $(2F_1-F_2)$ or $(2F_2-F_1)$.

Calculations show that third order intermodulation will occur within the data band of the transmitted signal. Although there are a large number of such possible third order intermodulations that occur within the data band, the worst case analysis suggests that the beating of a video carrier against the video carrier of another channel is likely to cause the worst possible third order intermodulation interference. Yet other serious problems could arise from third order intermodulation of signals in the luminance bandwidth signals and the chrominance band of the video signal in the assigned video channel. Table A below shows possible intermodulation interference combinations in the data band 209.15–209.45 MHz of Channel 12's signal according to frequency allocations of stations by the United States Federal Communications Commission.

TABLE A

| | |
|---|---|
| Channel 9 Video Information | Channel 11 Color Carrier |
| Channel 9 Video Carrier | Channel 21 Video Information |
| Channel 10 Video Carrier | Channel 7 Color Carrier |
| Channel 10 Video Information | Channel 11 Color Carrier |
| Channel 11 Video Information | Channel 12 Video Carrier |
| Channel 12 Video Information | Channel 12 Color Carrier |
| Channel 13 Video Carrier | Channel 13 Color Carrier |
| Channel 13 Color Carrier | Channel 14 Video Information |
| Channel 14 Video Carrier | Channel 15 Video Information |
| Channel 14 Color Carrier | Channel 25 Video Information |
| Channel 15 Video Carrier | Channel 26 Color Carrier |
| Channel 15 Color Carrier | Channel 27 Color Carrier |

Although the above combinations show that the third order intermodulation arises primarily from interference between signals from different stations, it is possible as shown above for such intermodulation interference to arise from signals of a signal station. Which third order intermodulation signal will cause the most interference is problematical and depends upon the relative received signal strength of each of the signals that may potentially cause interference.

Nonetheless, particularly when the signal carrying the data is relatively low power, such third order intermodulation can cause substantial problems with data reception.

FIG. 5 shows the intermodulation plot 30 with the video carrier signal curve 32 and the data signal curve 34 in a modelled system plotted in terms of power-input in dBm versus power-output. In the modelled system, the receiver has a gain of 30 dB, the video to data ratio is 65 dBc at 50 millivolts peak-to-peak data injection and the third order intercept point 35 is +26 dB. This third order intercept point 35 is the interception of the gain of the third order intermodulation curve 30 and the carrier curve 32, ignoring limits on the gain of the video carrier output signal.

Note that in this model, third order intermodulation interference 30 is predicted to be greater than the data signal curve 34 unless the power input is less than −40 dBm. Such third order intermodulation interference cannot be removed with filters as the third order interference is in the data bandwidth. Therefore, intermodulation may prevent detection of the data for relatively strong signals.

Given the problems noted above in connection with FIG. 4 for weak input signals and FIG. 5 for strong signals, this drastically limits the range of reception of the data. A receiver combined with a narrow geographic band may have to be in the −40 dBm and −50 dBm range for the data to be readily received.

Improving the third order intercept point would result in reduced third order intermodulation, thereby permitting the receiver to discriminate the data at more powerful signal levels. However, increasing the third order intercept point typically increases the noise figure of the tuner. As pointed out above, it is desirable to have as small a noise figure as possible to avoid the data being lost in the noise floor for weak signals.

Therefore, it is a first object of the invention to improve the noise figure of video tuners, preferably to less than 6 dB. However, that improvement in the noise figure cannot be attained if the third order intermodulation products are increased. It is a second object of the invention to provide a tuner having as low a noise figure as possible while avoiding third order intermodulation. It is yet another object of the invention to reduce the interference between the chroma portion and the audio carrier with the data portion of the combined video/data signal. It is yet a still further object of this invention to obtain this improved performance with low phase distortion of the data signal over a wide dynamic range for the input signal.

SUMMARY OF THE INVENTION

These and other objects of the invention are attained by providing an improved tuner specifically designed to separate data over a wide dynamic range. The input signal is applied directly to a broad band pass filter having low insertion loss and then applied to a narrow band amplifier and then subsequently applied to a narrow band filter. The output of this narrow band filter is applied to an automatic amplitude controlled attenuator to attenuate the more powerful signals to avoid intermodulation distortion in the subsequent mixer. This mixer shifts the received combined video and data signal down to the intermediate frequency.

The intermediate frequency section couples the output of the mixer to a diplexer to prevent reflection and splits the data and video portions into two separate signals with a splitter or separator. A substantially unattenuated portion of the IF signal from the splitter is coupled to a data IF narrow band pass filter designed to have a band pass only for the data bandwidth portion of the IF signal to provide a data IF signal. The output of the data IF narrow band pass filter is amplified and then shifted by a second mixer to the frequency at which the data was modulated by the data carrier in the encoder; i.e., the video base band data IF band. The output of the second mixer is further filtered and amplified to provide the data signal to a decoder.

The video signal is provided to a video detector to provide a composite sync signal for use by the data decoder. Further, the sync signal is also used to drive the IF local oscillator so that the IF local oscillator is in frequency and phase lock with the received video signal. The output of the IF local oscillator is coupled to the second mixer for heterodyning the IF data signal.

DETAILED DESCRIPTION OF THE INVENTION

Figure 1:
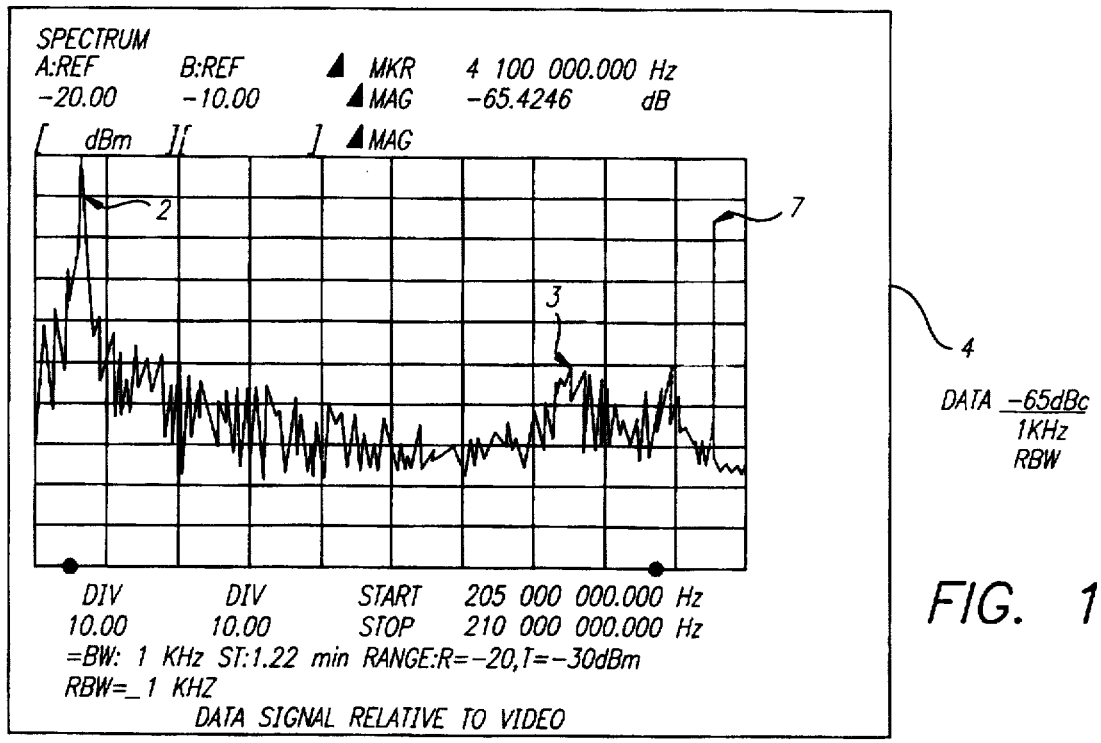
FIG. 1 is a picture of a spectrum analysis of an NTSC video signal containing the data encoded according to U.S. patent application Ser. No. 07/715,920.
Figure 2:
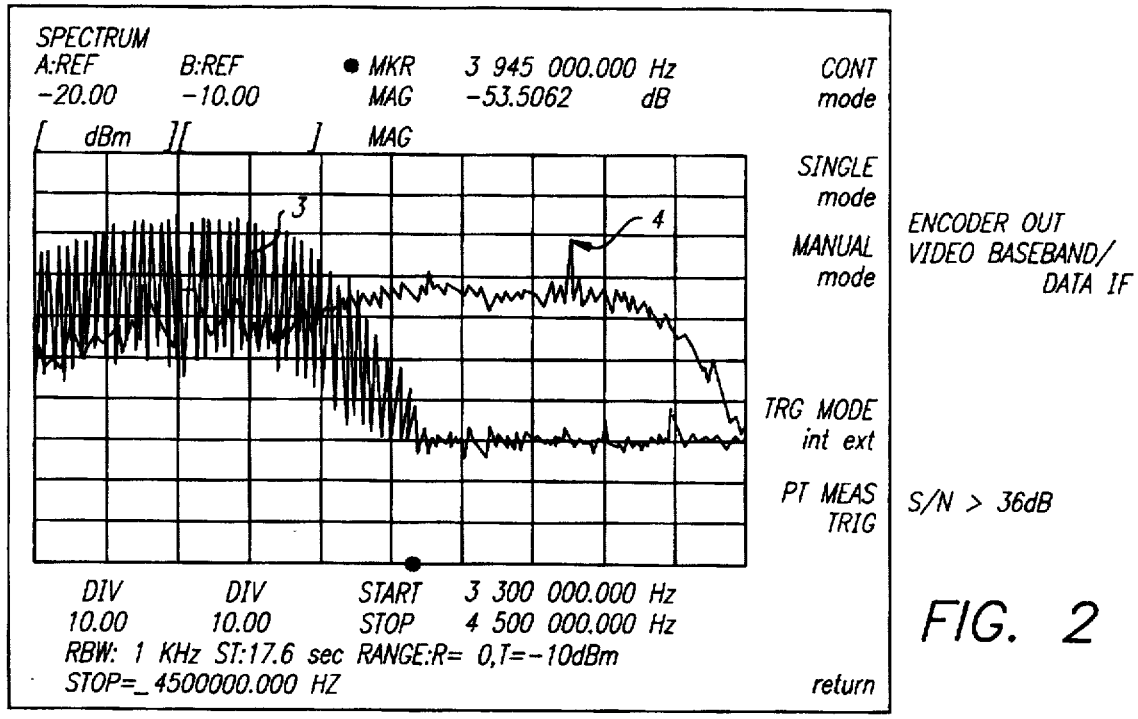
FIG. 2 is a detail of the chroma and data portions of the spectrum of FIG. 1.
Figure 3:
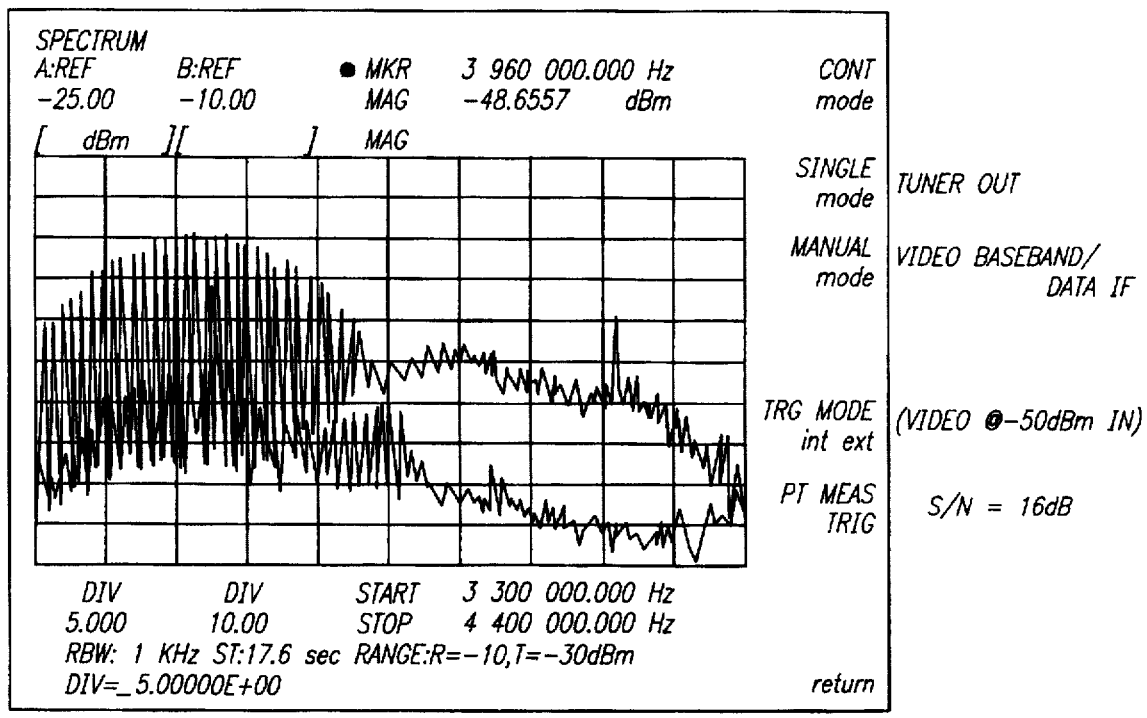
FIG. 3 is a detail of the chroma and data portions of the spectrum of a video signal such as the one shown in FIG. 1 with a low signal to noise ratio.
Figure 4:
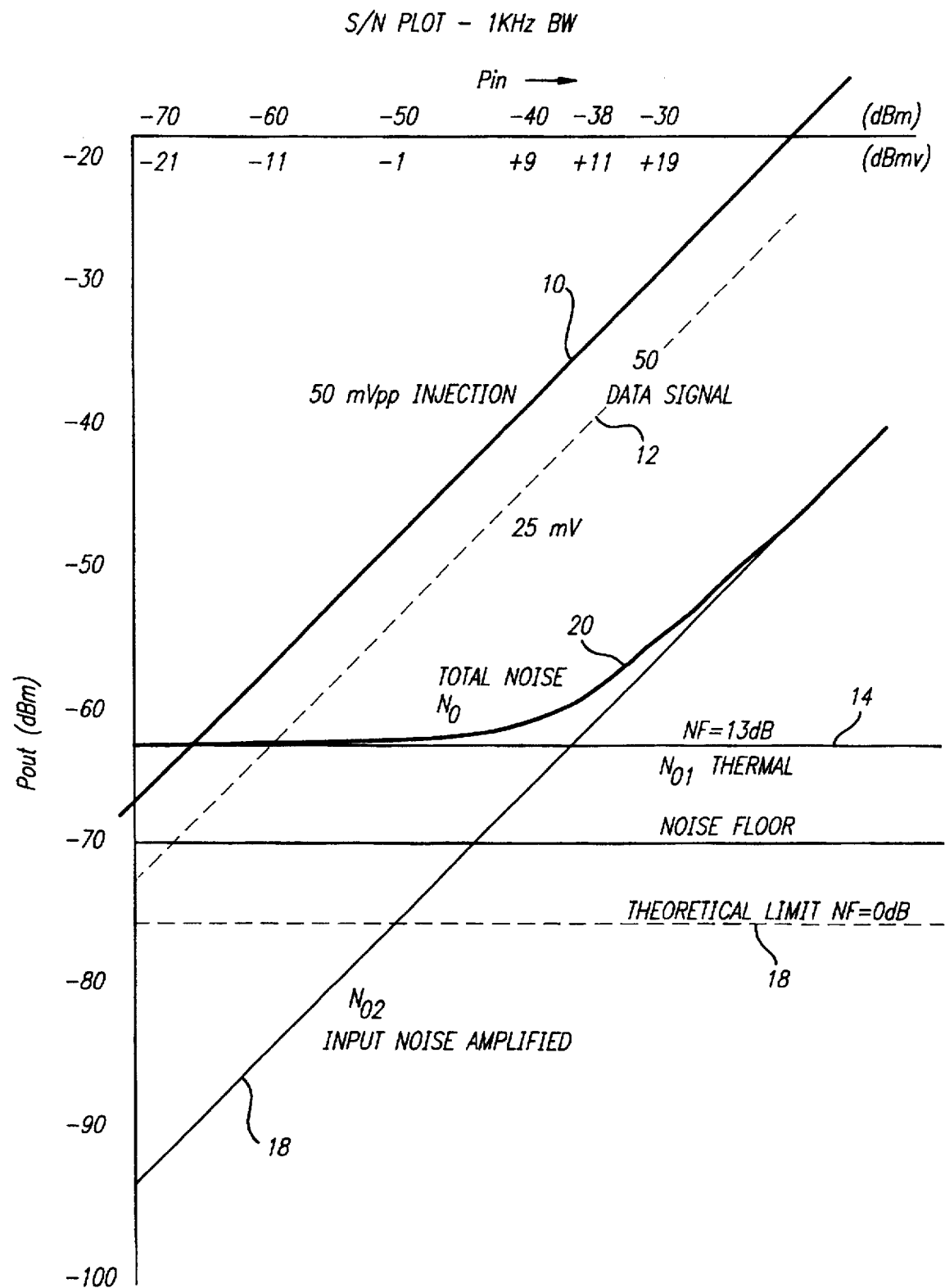
FIG. 4 is a signal to noise ratio plot for a modelled tuner.
Figure 5:
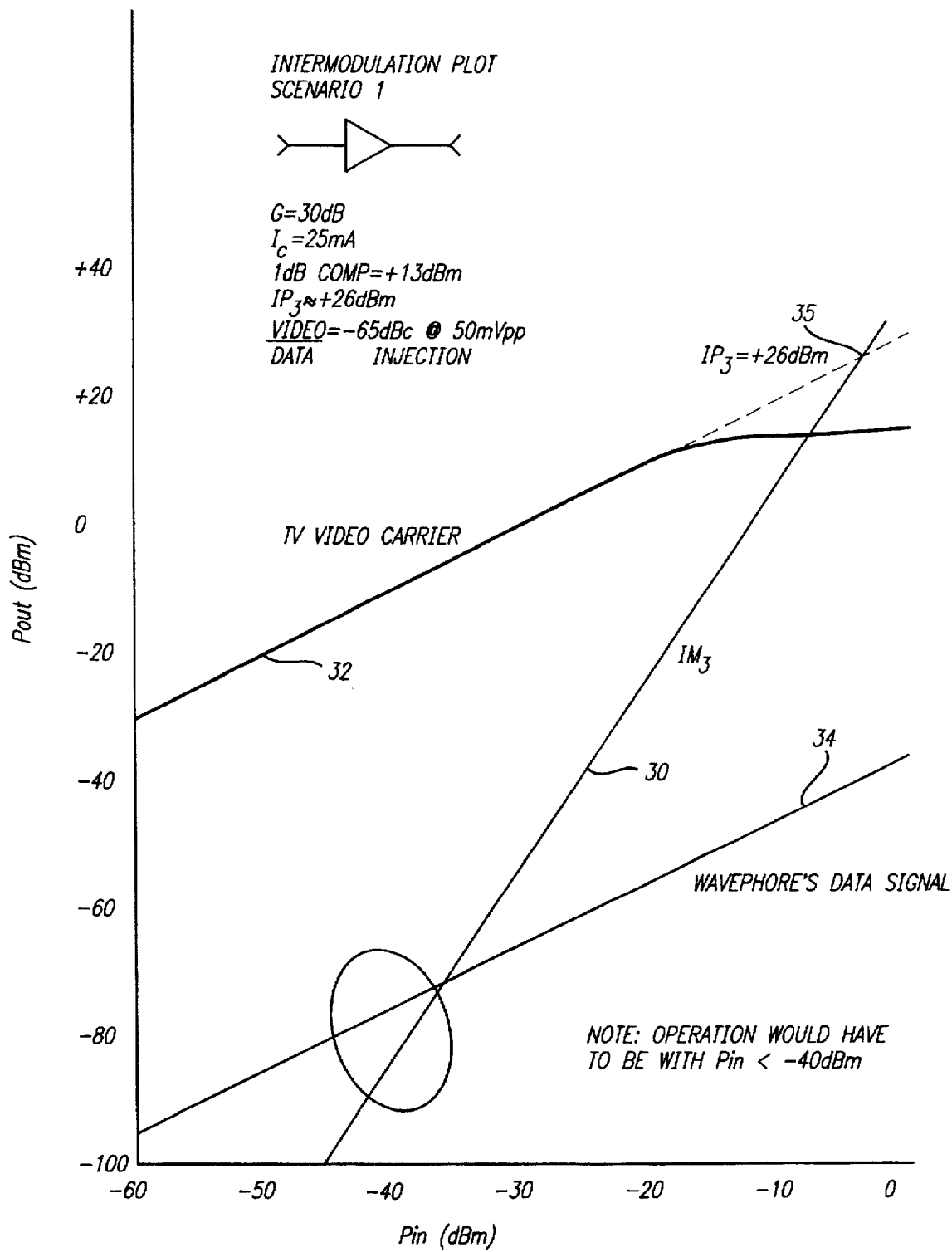
FIG. 5 is an intermodulation plot for a modelled tuner.
Figure 6:
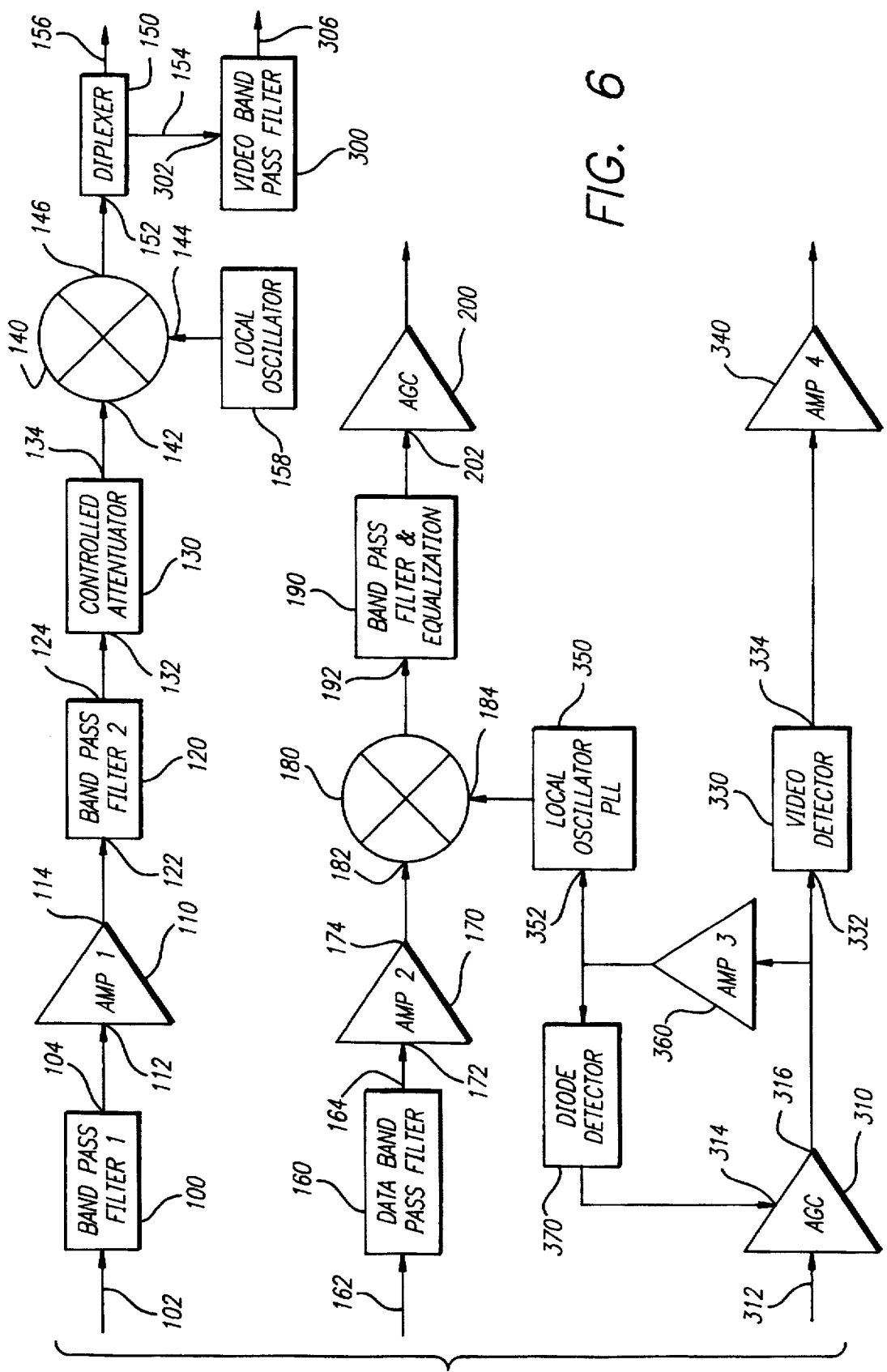
FIG. 6 is a block diagram of a tuner according to the present invention.

FIG. 6 shows a block diagram of an embodiment of the invention designed to separate the portion of the combined received signal data from the video signal in the Channel 12 signal. Although the particular embodiment is for an NTSC signal according to the United States Federal Communications Commission's standards, one of ordinary skill in the field would recognize that the concepts within this patent application are applicable to other television channels and to other television signal formats such as PAL and SECAM.

In FIG. 6, the received combined video/data signal at the frequency of Channel 12, may have an input power range of from about −15 dBm to about −60 dBm and still be detected without significant bit error rates in the data signal. The received video/data signal may be received at the input 102 from an antenna or from a television cable at a nominal 75 Ω impedance. The video carrier for the video signal at Channel 12 is 205.25 MHz. The signal also contains the data which has been injected at base band using a data carrier at 4.19 MHz as described in U.S. patent application Ser. No. 07/947,134. Thus, in the received video signal, the data carrier frequency is at 209.45 MHz, with the data energy lying almost exclusively between 209.45 MHz and 209.15 MHz. The chroma carrier frequency is at 208.83 MHz and the audio carrier frequency is at 209.75 MHz.

The input signal 102 is applied to a first RF band pass filter 100, which preferably has a 75 Ω input impedance and a 50 Ω output impedance. The filter 100 has an extremely low insertion loss, typically on the order of −0.3 dB, a center frequency of 207 MHz, and a medium bandwidth of 43 MHz between the three dB down points.

The output of the filter 104 is applied to an input 112 of a first broadband RF amplifier 110. The broadband amplifier has a gain of approximately 20 dB, a center frequency of 207 MHz, and a bandwidth at the 3 dB down point of 70 MHz. As explained in more detail below, the RF amplifier 10 is designed to minimize the amount of thermal noise less than 2 dB injected into the input signal, and has a third order intermodulation intercept point of +35 dBm.

The output 114 of the amplifier 110 is applied to an input 122 of a second, narrow band pass filter 120. The narrow band pass filter has a center frequency of 207 MHz, an insertion loss of −4 dB and a bandwidth at the 1 dB down point of 5 MHz.

The output 124 of the narrow band pass filter 120 is applied to an input 132 of an automatic attenuation controlled attenuator 130. This automatic attenuation controlled attenuator 130 has a low insertion loss and generates a control voltage sufficient to cause the attenuator to attenuate by 20 dB any signal where the input signal at input 102 has a power greater than −30 dBm. For input signals at input 102 less than about −30 dBm, the attenuator provides substantially no attenuation of the input signal.

The output 134 of the attenuator 130 is applied to a first input 142 of a balanced mixer 140 to shift the frequency of the received signal to the intermediate frequency. A second input 144 of the mixer 140 is coupled from a free running, crystal based, low jitter local oscillator generating a 251 MHz signal with minimal noise. The active mixer 140 has a 12 dB conversion gain, 5 dB single side band noise figure and a bandwidth of 13 MHz. The mixer 140 is designed to provide a 50 Ω output impedance between 41 and 46 MHz at an output 146. The mixer inverts the spectrum of the data and the video so that the frequency of the video IF carrier is at 45.75 MHz and the data carrier at IF is at 41.55 MHz.

The output 146 of the mixer 140 is coupled to an input 152 of a diplexer/splitter 150 to avoid reflection of the signal back into the mixer 140 which provides a higher third order intermodulation intercept point. A video port 154 of the splitter 150 is used for processing the video portion of the combined IF signal while a data port output 156 is provided for further processing to obtain the data signal. Preferably, the splitter 150 has a less than 1 dB loss at the data port 156 and a 10 dB loss at the video port 154.

The data port 156 is coupled to a data path starting at the input 162 of a data IF band pass filter 160. The data IF pass band filter has an insertion loss of 12 dB, a center frequency of 41.7 MHz, and a bandwidth of 280 KHz at the 1 dB–15 dB down points. Thus, the data IF band pass filter rejects most of the lumina, and some of the chroma and the audio portions, centered around the data band portion of the IF signal. However, the output of the data IF pass band filter 160 is such that the residual chroma and audio information is probably at about the power level of or greater than the power level of the data.

The output 164 of the data IF band pass filter 160 is coupled to the input 172 of a data IF amplifier 170. The amplifier 170 has a gain of 22 dB and a center frequency of 41.7 MHz.

The output 174 of the data IF amplifier 170 is coupled to an input 182 of a second balanced mixer 180. The mixer 180 also has a local oscillator input port 184 coupled to receive the phase locked video IF carrier of 45.75 MHz (thereby shifting the video signal to the base band). The mixer has a gain of about 6 dB.

Figure 9:
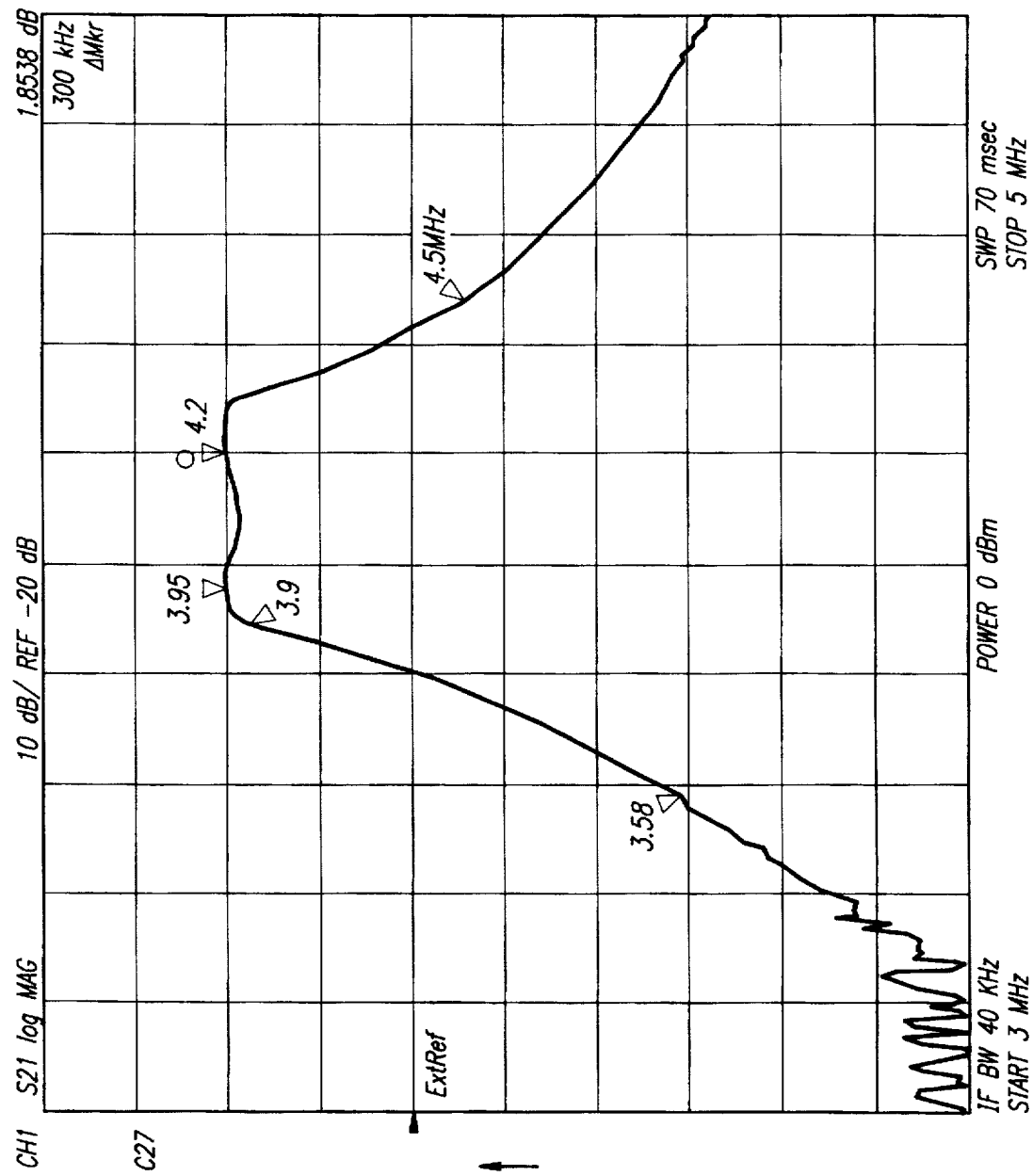
FIG. 9 is a power spectrum of the filter 191.
Figure 10:
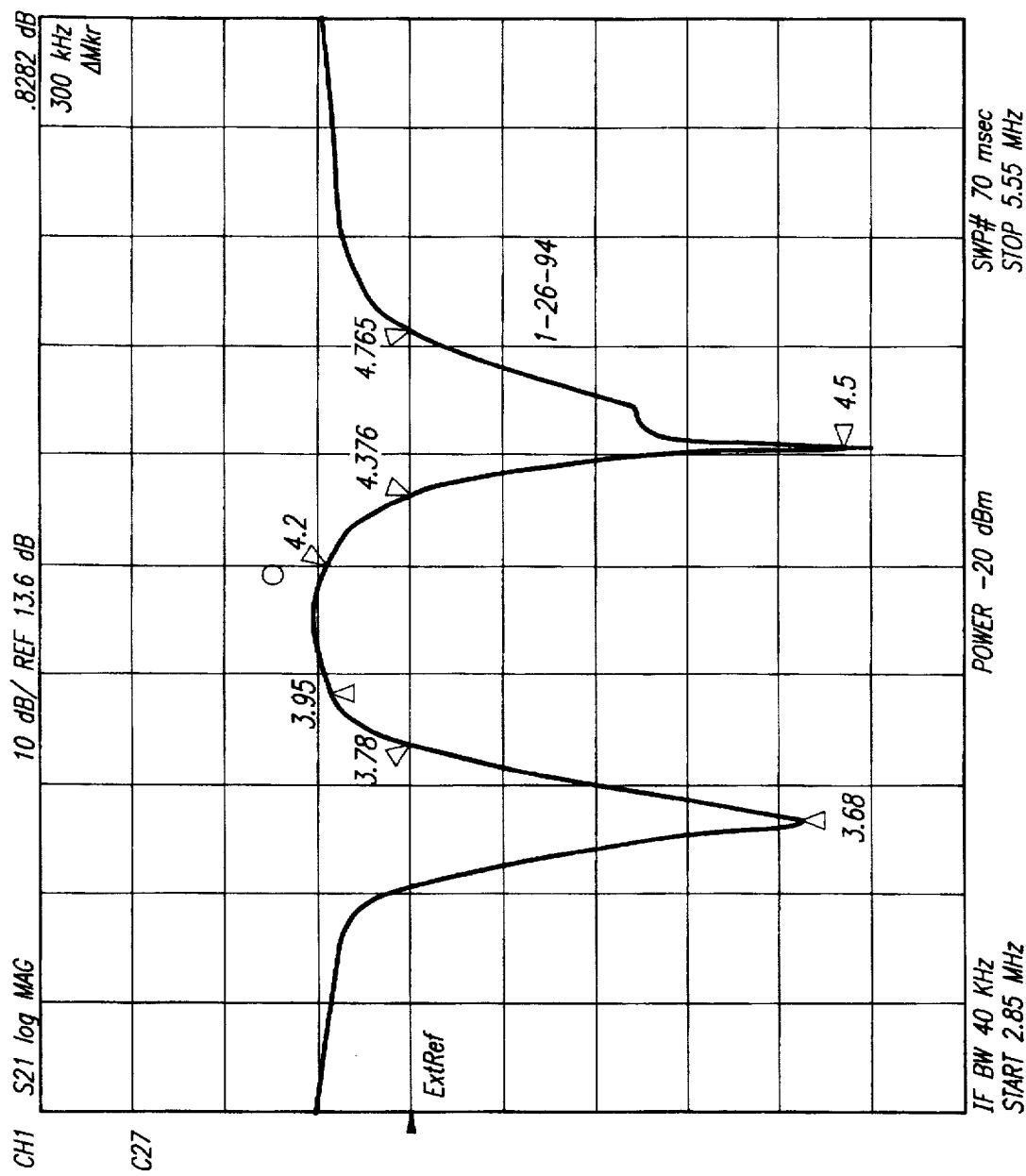
FIG. 10 is a power spectrum of the filters 195 and 197.
Figure 11:
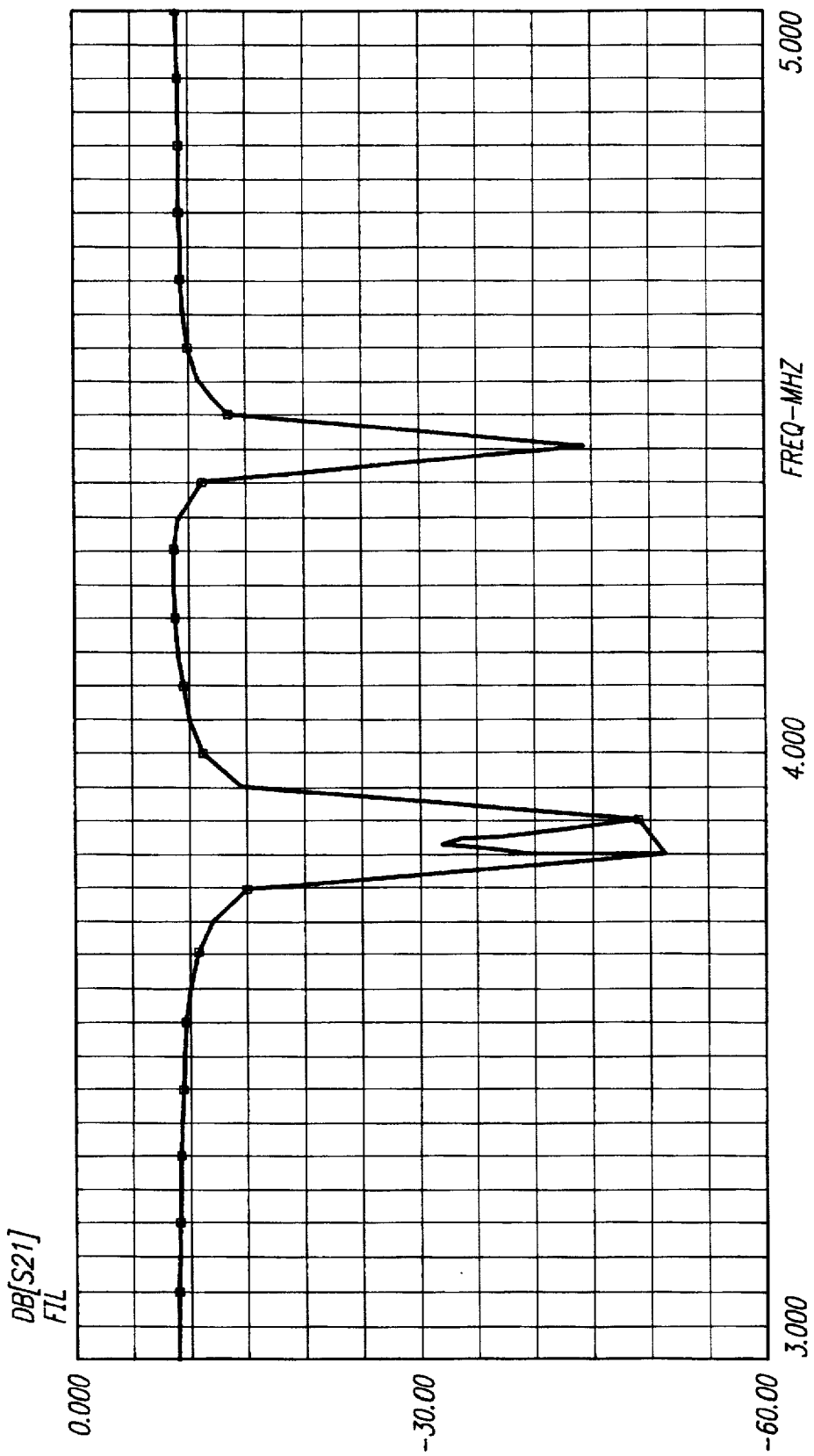
FIG. 11 is a power spectrum of the filters 201, 203 and 205.

The output 186 of the local mixer comprises primarily the data band in the video base band signal (i.e.; 3.9 to 4.2 MHz for an NTSC signal) with some chroma and audio portions of the video signal. That data band signal is coupled to the input 192 of a data band pass filter assembly 190. This band pass filter assembly 190 is shown in more detail in FIG. 7. The assembly 190 has a pass band filter 191 of from 3.9 MHz to 4.2 MHz and an insertion loss of 12 dB having the power spectrum shown in FIG. 9. The pass band filter 191 is coupled through an amplifier 193 to cascaded chroma and audio stop band filters 195, 197 having power spectrum characteristics such as those shown in FIG. 10 and an insertion loss of 10 dB. Further, the output of the cascaded filters may be amplified by amplifier 196 and applied to cascaded notch filters 201,203, 205 that have power spectrum characteristics of FIG. 11, having notches at 3.75 MHz, 3.8 MHz and 4.35 MHz and an insertion loss of 28 dB. Thus, these last three filters are present to reject the residual chroma portions and audio portion near the data band of interest. 14

It is important to note that for other types of signal formats such as SECAM and PAL, the band pass filter 191 has a pass band comprising the data bandwidth in the base band video signal, the chroma stop filter has a stop band comprised of the chroma band of the base band video signal and the audio band stop filter has a stop band comprised of the audio band. Finally, the notch filters 201,203 and 205 have notch frequencies close to the edge of the data band in the video base band signal. It is also important to note that the sequence of the filters in assembly 190 is set to maintain low noise figure and yet not degrade third order intercept point in the amplifiers.

Preferably, the output of the last notch filter 207 is amplified again by amplifier 207 having a gain of 15 dB, equalized by a equalizer filter 209, which provides phase equalization for the filters in the assembly 191. The output of the equalizer is then buffered by buffer 211 to be provided to the input 202 of an automatic gain controlled amplifier 200 of FIG. 6. The automatic gain controlled amplifier 200 has a gain between 47 dB and −3 at data output 204. The feedback loop of the automatic gain controlled amplifier may also be bypassed so that the loop gain may be manually adjusted. Thus, filter 160, amp 170, modulator 180, filter assembly 190 and AGC 200 comprise the data path.

Figure 12:
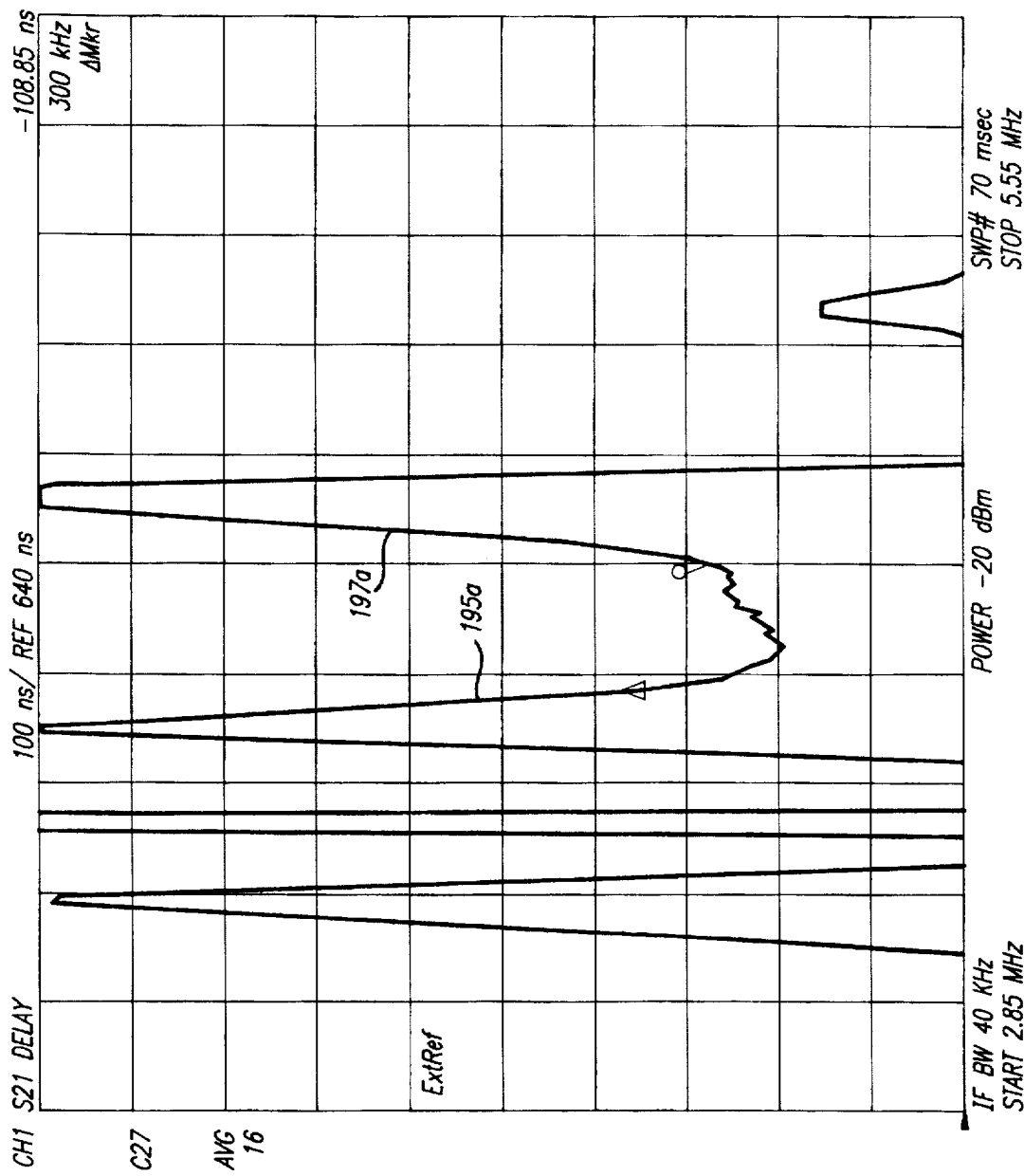
FIG. 12 is a chart showing the group delay of filters 195 and 197.

The band stop filters 195, 197 have a unique feature with regard to group delay equalization, which is explained in connection with FIG. 12. FIG. 12 shows a delay chart for the two filters 195, 197 in series with the horizontal axis representing frequency from 2.6 MHz to 5.6 MHz and the vertical axis representing delay in units of 100 nsec. The band pass is marked with triangles and is between about 0.75 MHz and 4.1 MHz. As can be seen, the lower chroma frequency band stop filter 195 has a steep group delay negatively going slope 195a in the desired data pass band. The higher audio band stop filter 197 has an approximately equally steep positively going group delay slope 197a in the pass band. Separately, each group delay of filters 195, 197 would severely corrupt the data, but together the group delays of the two filters 195, 197 effectively cancel each other out producing a much flatter respose in the pass band as shown between the two triangle markers (FIG. 12). The notch filters are also expeditiously configured to cancel group delays and produce a flat response by using the same technique of approximately matching the slopes for the delay plots. Thus, a dedicated equalizer is mainly needed only to compensate for the data band pass filter 191.

It is also necessary to provide the combined vertical and horizontal blanking intervals for receivers such as those described in U.S. patent application Ser. No. 07/947,134. The video output 154 of the splitter 150 is applied to an input 302 of a video band pass filter 300. The filter preferably has an insertion loss of 3 dB, a center frequency of 44.5 MHz, and a bandwidth at the 1 dB down points of 3 MHz to provide at the output 306 of the filter the video IF signal. It should be noted that after this band pass filter, the data portion and most of the chroma portion of the IF video signal have been removed and the signal comprises largely lumina information.

The output of the video IF band pass filter 300 is coupled to an input 312 of a gain controlled amplifier 310. The amplifier 310 has a gain adjustable between 20 and 30 dB based upon the input at a control node 314 and is coupled to an input 332 of a video sync detector 330. The output 334 of the video detector 330 is provided through an amplifier 340 to provide a base band horizontal and vertical sync signal (composite sync) as described in the prior applications of the assignee, which are referred to above.

A further important feature of the embodiment is that the IF local oscillator 350 must be frequency locked and preferably phase locked to the video signal to minimize timing errors in the decoder. This is accomplished by taking the output 316 of amplifier 310 and coupling the output to amplifier 360. Amplifier 360 preferably contains an output resonant circuit that is coupled to an input 352 of the local oscillator 350 such that the local oscillator generates the IF signal by phase locking to the output of the amplifier 360. To provide automatic gain control for the video detection circuitry, a diode detector and loop filter 370 supply a control voltage to the control node 314 of the AGC amplifier 310.

Figure 8:
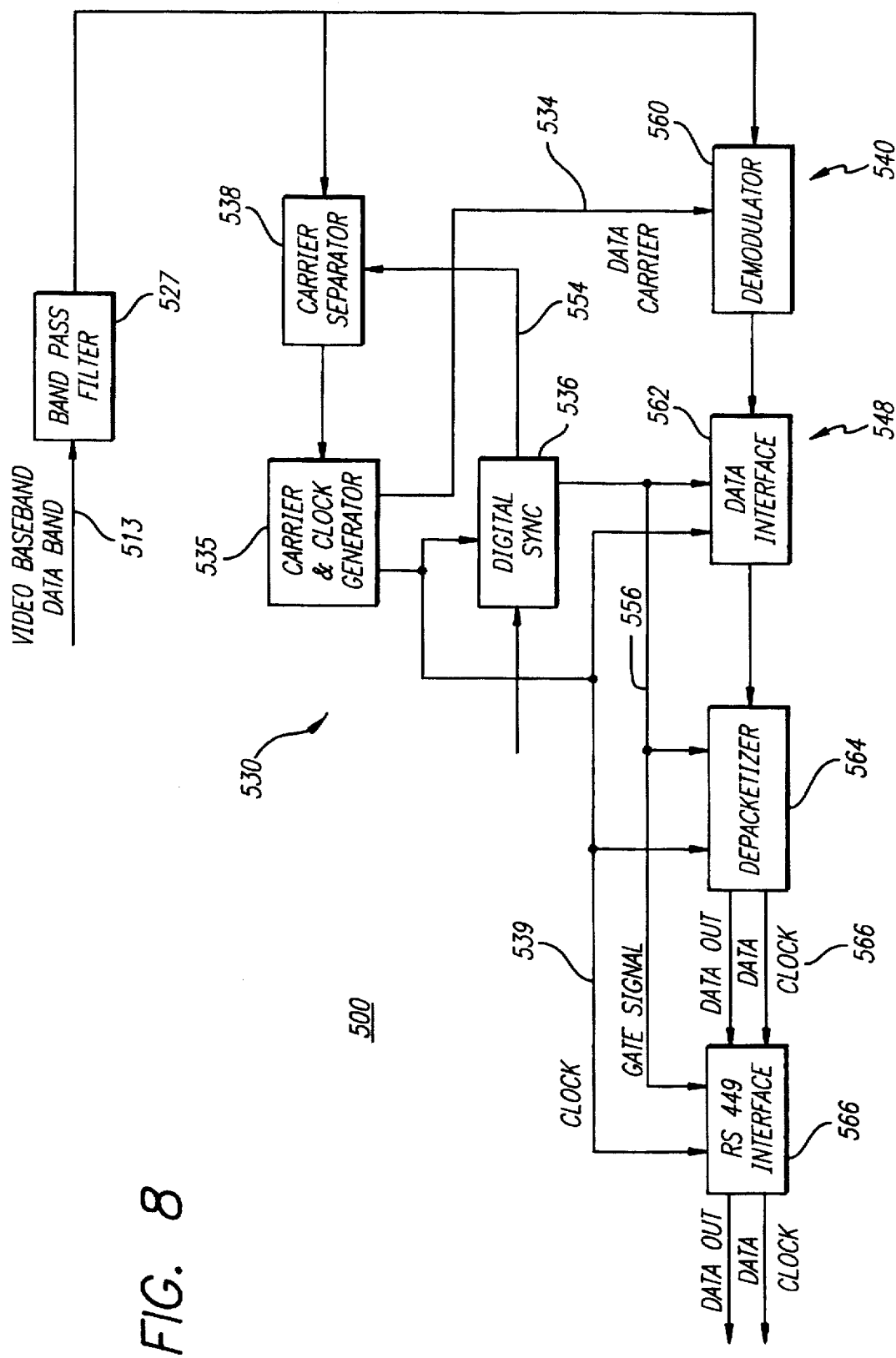
FIG. 8 is a block diagram of a decoder adapted to be used with the tuner of the type shown in FIG. 6.

FIG. 8 shows a block diagram of a decoder that may be used with the tuner according to the present invention. The decoder 500 comprises two sections: a timing section 530 and a data section 540.

That output data signal 204 comprising the data portion of the signal at the frequencies between 3.9 and 4.2 MHz from the amplifier 200 is filtered by a data band pass filter 327. A data carrier 534 provided by the timing section 530 is provided to a demodulator 560 selected to be compatible with the modulator of the transmitter section and to provide base band data. The demodulated output is then sampled by a data interface 562 to provide digital data. The data interface may include an analog to digital converter, and an adaptive base band equalizer to provide adaptive equalization for noise and phase distortion in the broadcast medium. In an embodiment, the data interface may also include a comparator that in response to a symbol timing signal 556 provides true (or squared up) digital data (as opposed to band width limited or rounded data) for optional forward error correction decoding as is known in the art. The digital data from the data interface 562 is stripped by a depacketizer 564 and the start codes and any error correction codes are removed by the depacketizer 564 and the data is descrambled.

The digital data output of the depacketizer 564 is supplied to a IEEE RS 449 Interface 566 along with a variable rate data clock. That interface 566 includes a first in/first out buffer (not shown) into which the data is clocked under control of the clock signal 565. The data is supplied at the output of the interface 566 preferably under control of the variable data clock generated by the depacketizer 564.

Figure 7:
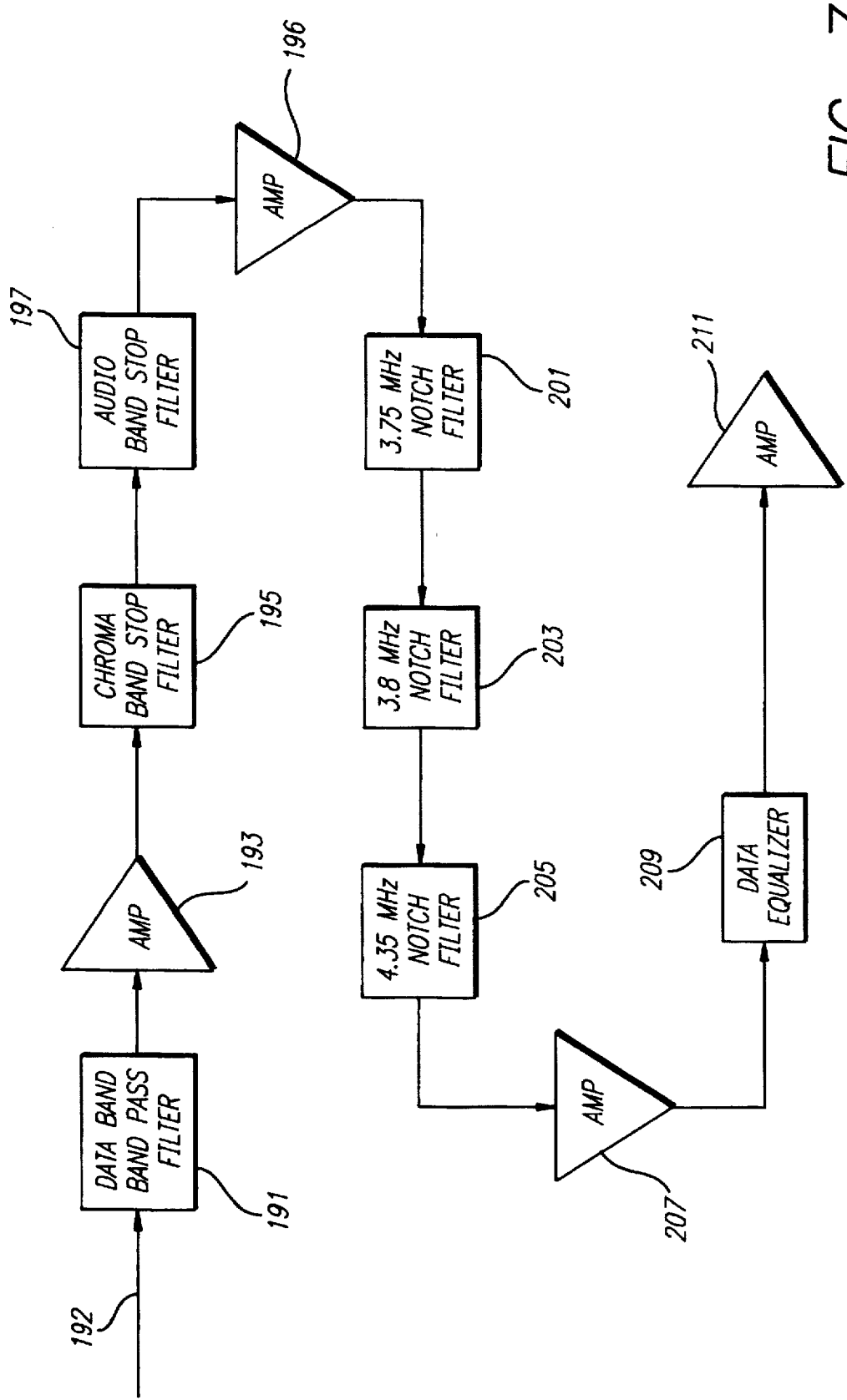
FIG. 7 is a block diagram of the data band pass filter assembly 190 shown in FIG. 6.

The composite sync signal from the output 344 of the amplifier 340 is coupled to the timing section 530 in FIG. 7. The timing section 530 includes a carrier separator 538 and a data carrier and clock generator 535. To provide phase synchronization between the data carrier of the transmitter and the data carrier 534 in the decoder 500, the carrier separator 538 detects the phase synchronizer marker data carrier burst at the start of each horizontal line in the signal as explained in U.S. patent application Ser. Nos. 947,134 and 076,137. Timing for detecting the burst at the start of each horizontal line is provided by a digital synchronizer 534 through timing control signals 554 generated by the digital synchronizer 536. The carrier separator 538 supplies a phase control signal to a carrier generator 535 so that the phase of the data carrier 534 in the receiver is synchronized to the phase of the data carrier in the transmitter and the two data carrier frequencies are locked. The phase and frequency lock may be accomplished in the same manner that the color carrier in a conventional receiver may be synchronized to the color carrier in the transmitter. The carrier generator 535 also generates a clock signal 539 at the same frequency as the data carrier 534 and in a known phase relationship with the data carrier 534. In an embodiment, the data clock 539 may be merely a squared up version of the data clock obtained through a comparator. The symbol timing signal 556 may also be generated by reference to the horizontal sync pulses.

In the decoder embodiment 500 of FIG. 7, the digital synchronizer 536 should preferably be adjusted so that the gating signals 556 and the timing control signals 554 are adjusted to compensate for the phase delays produced by any filtering. Such compensation may be accomplished by adaptive equalizers. In particular, the output of the demodulator 560 should with the exception of noise and distortion replicate the signal used in the transmitter for modulating the data carrier. Hence, the digital synchronizer 536 provides the gating signal to preferably sample the output of the demodulator when the positive or negative peaks of the analog data signal are expected to occur. In addition, the digital synchronizer 536 also supplies gating signals 556 to the depacketizer 564 so that the blanking intervals may be removed from the data stream.

The depacketizer 564 preferably supplies both data and a data clock 565 to the RS 499 Interface 536. This data clock is generated by the depacketizer 564 by counting the number of bits transmitted during the immediate previous video frame. If less data is transmitted during the most recent frame, the data clock rate decreases to follow the data rate. If more data is transmitted during the most recent frames up to the maximum rate, the data clock rate increases. The adjustment of the clock rate is such that generally there will be data in the buffer of the interface 566. However, it should be noted that when no or minimal data is being transmitted for several frames, the buffer will empty.

To further augment phase synchronization, an optional string of ones transmitted during the two hundred sixty third line described above may be used for altering the phase of the clock 535. The timing circuitry 530 identifies the vertical sync pulse of the transmitted signal. Once the timing circuitry 530 has identified the vertical sync pulse, the first half of the two hundred and sixty third line can be identified. Either the interface circuit 566 or the digital sync 536 generate a signal (not shown) to alter the phase of the carrier until synchronization of the phase of the carrier between the input and the output has been obtained as detected by the appropriate element. Preferably, phase synchronization is accomplished by the digital synchronizer 536 controlling the phase of the carrier so that the string of ones marker transmitted during the first half of the two hundred sixty third line is a maximum positive amplitude. In addition, the carrier from the generator 335 has its phase continually adjusted in this manner to sustain phase synchronization between the carrier of the transmitter encoder that injected the data into the base band video signal and the receiver decoder of FIG. 7. In addition, the timing section 530 may also produce a switching signal (not shown) so that during each horizontal blanking interval, the input to the band pass filter 527 may be set to a mid level to avoid ringing in the capacitors in the band pass filter.

FIGS. 13 through 17 show circuit components for an embodiment of the tuner shown in FIG. 6 above. In particular, this tuner has an extremely low noise figure, about 1.5 dB and is designed for the amplifier 110 to have a third order intercept of +35 dB. Further, each of the amplifiers 110, 193, 196, 207 and 200 is designed to be highly linear and the overall circuit is designed to provide almost no phase distortion at the output in the data band of interest.

Figures 1, 13:
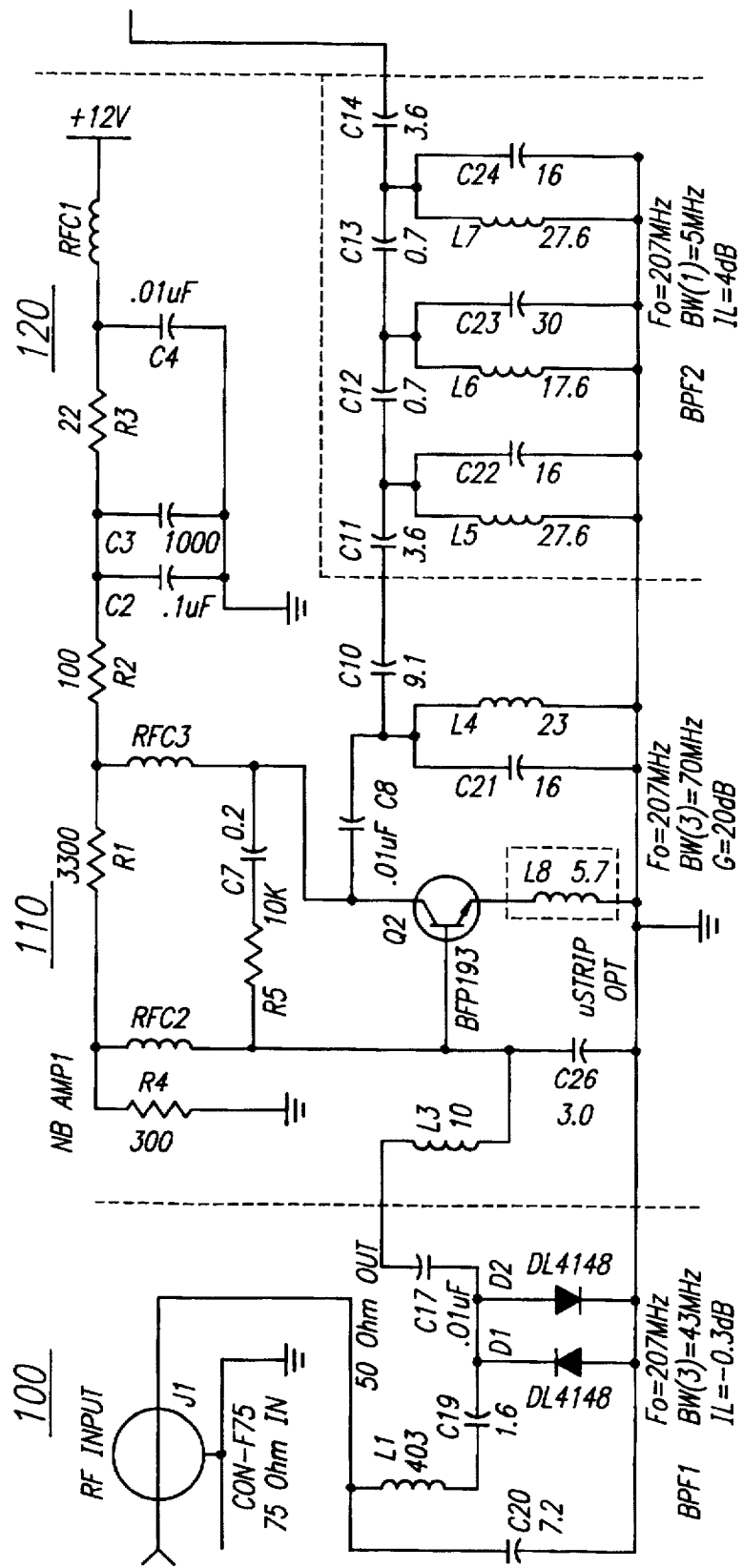
FIGS. 13 through 18 show a detailed schematic for the tuner disclosed in FIG. 6.
Figures 2, 13:
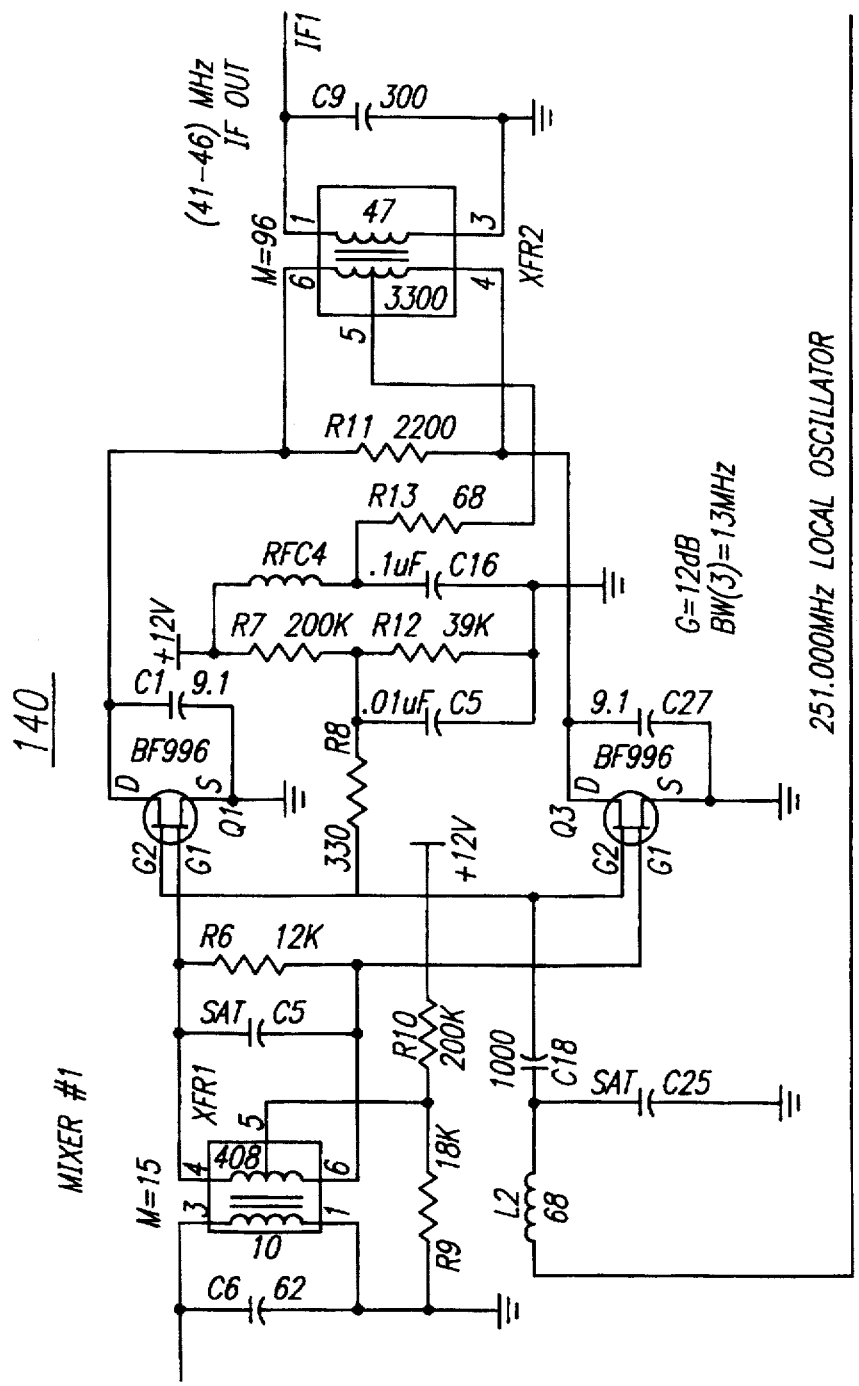

Turning to FIG. 13, band pass filter 100 comprises the following components, as shown in Table 1 (for FIGS. 13 through 17, the default units are picofarads, nanohenries and ohms):

TABLE 1

| Capacitor C20 | 7.2 pF |
| Inductor L1 | 403 nH |
| Capacitor C19 | 1.6 pF |
| Capacitor C17 | .01 uF |
| Diode D1 | DL4148 |
| Diode D2 | DL4148 |

Amplifier 110 comprises the following components, as shown in Table 2.

TABLE 2

| Inductor L3 | 10 nH |
| Capacitor C26 | 3.0 pF |
| Resistor R4 | 300 Ω |
| RFC1 (Choke 1) | Toroidal beads providing 10 KΩ inductive impedance over the frequency band of interest |
| RFC2 (Choke 2) | Toroidal beads providing 10 KΩ inductive impedance over the frequency band of interest |
| RFC3 (Choke 3) | Toroidal beads providing 10 KΩ inductive impedance over the frequency band of interest |
| Resistor R5 | 10 KΩ |
| Resistor R1 | 3300 Ω |
| Resistor R2 | 100 Ω |
| Capacitor C2 | .1 uF |
| Capacitor C3 | 1000 pF |
| Resistor R3 | 22 Ω |
| Capacitor C4 | .01 uF |
| Capacitor C26 | 3.0 pF |
| Transistor Q2 | BFP193 |
| Capacitor C8 | .01 uF |
| Inductor L8 | Microstrip having 5.7 nH inductance |
| Capacitor C21 | 16 pF |
| Inductor L4 | 23 pF |

It is important in this amplifier circuit to limit the collector current of transistor Q2 to the minimum possible, which in this collector current is limited to about 25 milliamps by this circuit, thereby providing a noise factor for the power amplifier of 1.5 decibels for the overall circuit performance while still providing a relatively high third order intercept point, on the order of +35 dB for this amplifier.

The components of the second band pass filter 120 are shown in Table 3:

TABLE 3

| Capacitor C11 | 3.6 pF |
| Capacitor C12 | 0.7 pF |
| Capacitor C13 | 0.7 pF |
| Capacitor C14 | 3.6 pf |
| Capacitor C22 | 16 pF |
| Capacitor C23 | 30 pF |
| Capacitor C24 | 16 pF |
| Inductor L5 | 27.6 nH |
| Inductor L6 | 17.6 nH |
| Inductor L7 | 27.6 nH |

Figure 18:
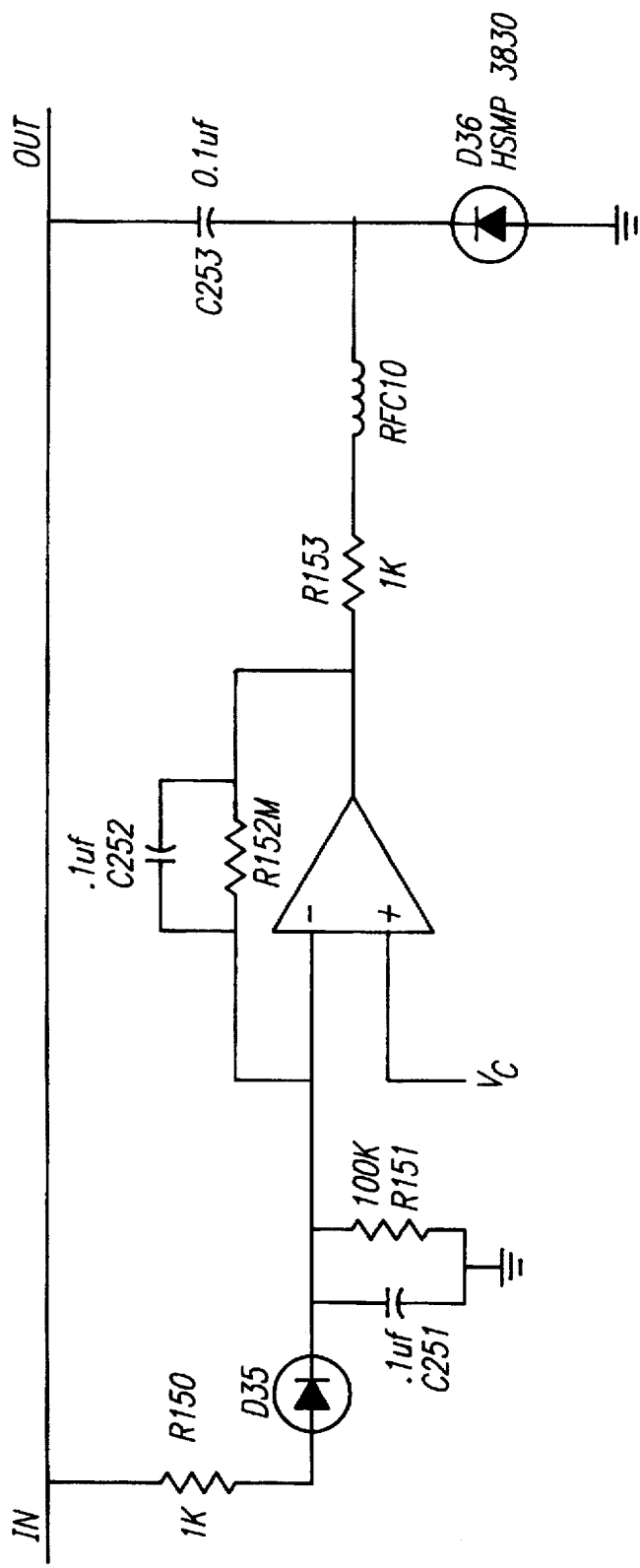

A schematic for the automatically controlled attenuator 130 is shown in FIG. 18. Component values for this attenuator are shown in Table 4 as follows:

TABLE 4

| Resistor R150 | 1K |
| Diode D35 | Selected to meet specification |
| Capacitor C250 | .1 uF |
| Resistor R151 | 100 KΩ |
| Resistor R152 | 1 MΩ |
| Capacitor C251 | .1 uF |
| Capacitor C252 | .1 uF |
| Resistor R153 | 1 KΩ |
| RFC10 (Choke 10) | Optional if needed to meet specification |
| Diode D36 | HSMP3830 |
| Capacitor C253 | .1 uF |

The attenuator 130 may be coupled between capacitor C14 and mixer capacitor C6 and between band pass filter 120 and mixer 140. Node Vc may be coupled to a manually adjusted control voltage to control the amount of attenuation or node Vc may be coupled through a diode detector (not shown) to the output and a filter (not shown) to provide the automatic control.

The first mixer 140, as shown in FIG. 13, comprises a balanced mixer with two field effect transistors Q3 and Q1 with the gates 1 of both transistors coupled to the RF input energy from the band pass filter 120 and the gates 2 of both transistors coupled to receive the local oscillator signal.

The values for the components in the mixer 140 are as follows:

TABLE 5

| Capacitor C6 | 62 pF |
| Inductor L2 | 68 nH |
| Resistor R9 | 18 KΩ |
| Capacitor C25 | |
| Capacitor C18 | 1000 pF |
| Resistor R9 | 18 KΩ |
| Resistor R10 | 200 KΩ |
| Capacitor C5 | SAT |
| Resistor R | 12 KΩ |
| Transistor Q1 | BF996 |
| Transistor Q3 | BF996 |
| Resistor R8 | 330 Ω |
| Capacitor C1 | 9.1 pF |
| Resistor R7 | 200 KΩ |
| Capacitor C15 | .01 uF |
| Resistor R12 | 39 KΩ |
| Resistor R7 | 200 KΩ |

TABLE 5-continued

| Capacitor C27 | 9.1 pF |
|---|---|
| Resistor R13 | 68 Ω |
| Transformer XFR1 | 10 nH on the input, 409 nH on the output and a mutual inductive coupling of 15 |
| Transformer XFR2 | 3300 nH on the input and 47 nH on the output and a mutual inductive coupling of 96 |
| Resistor R11 | 2200 Ω |

Figures 1, 14:
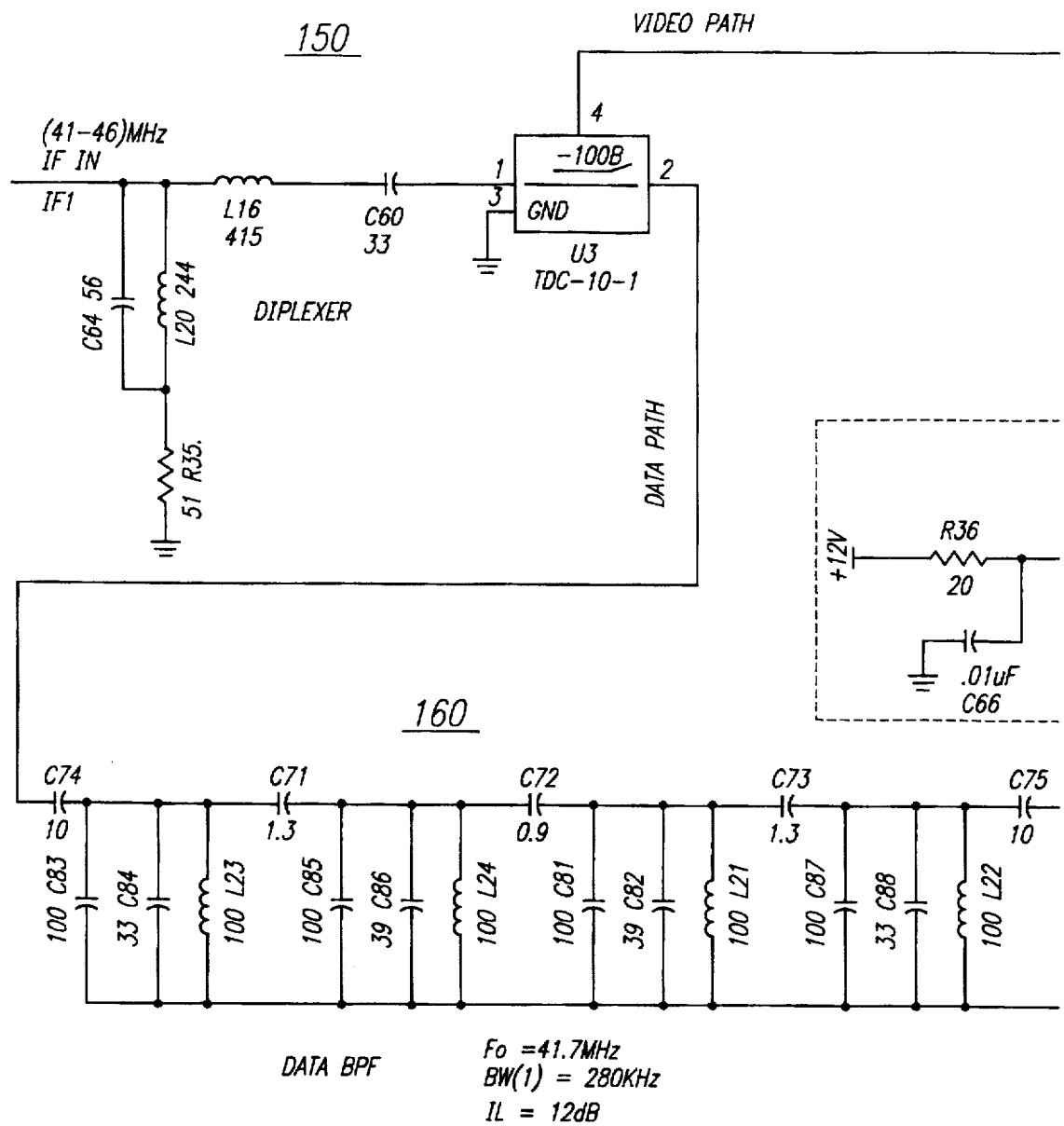
Figures 2, 14:
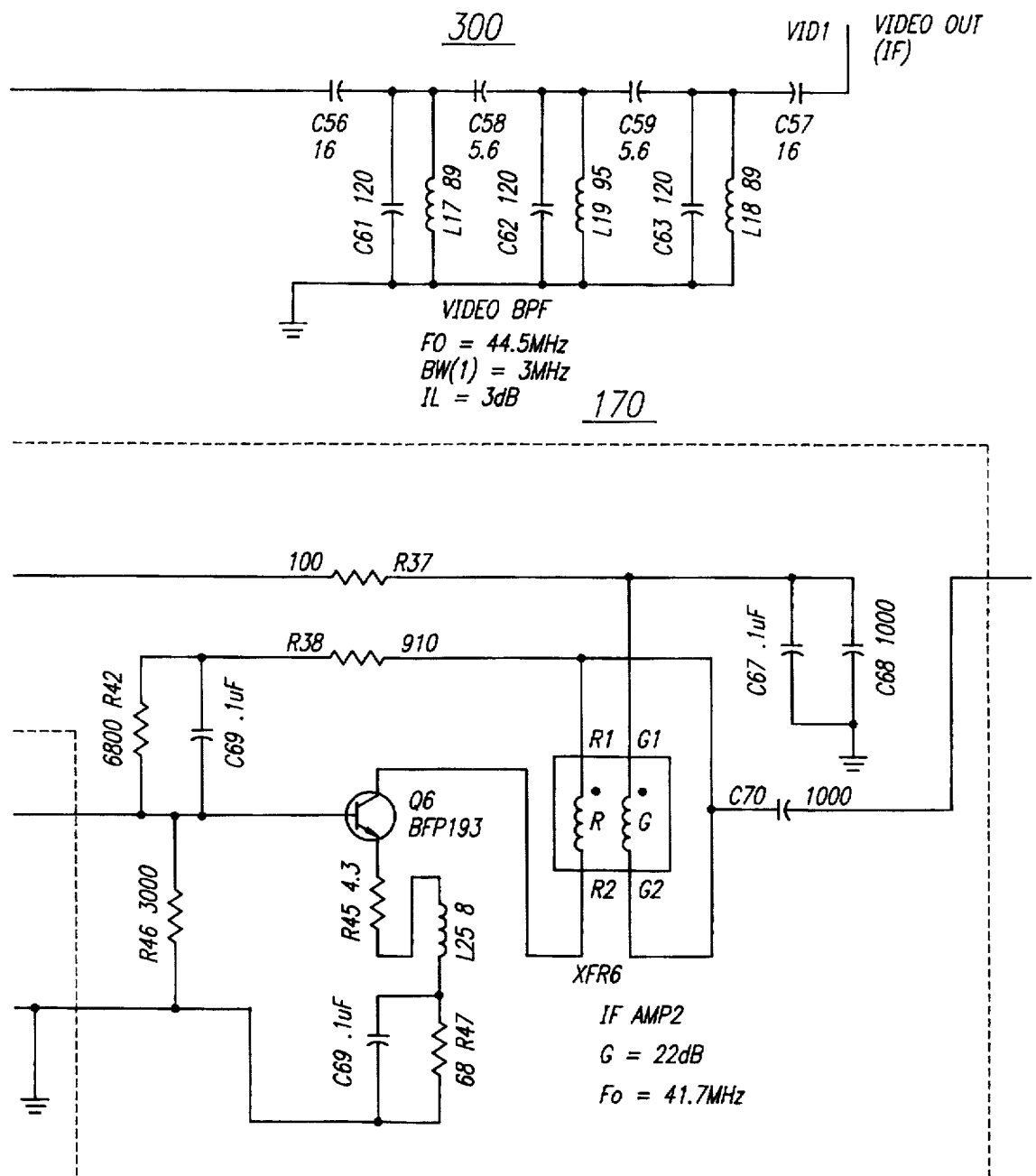
Figures 3, 14:
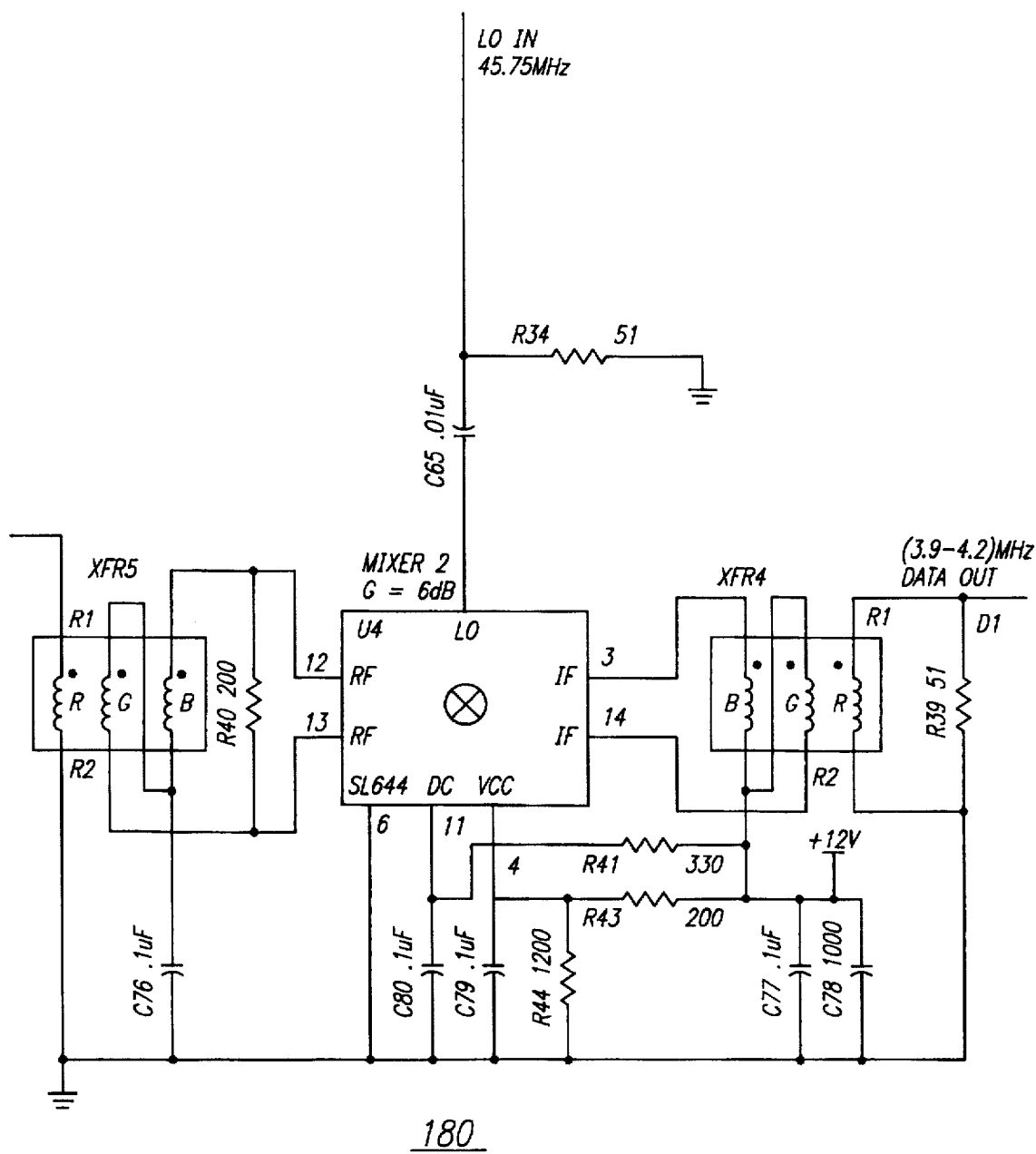
Figures 1, 15:
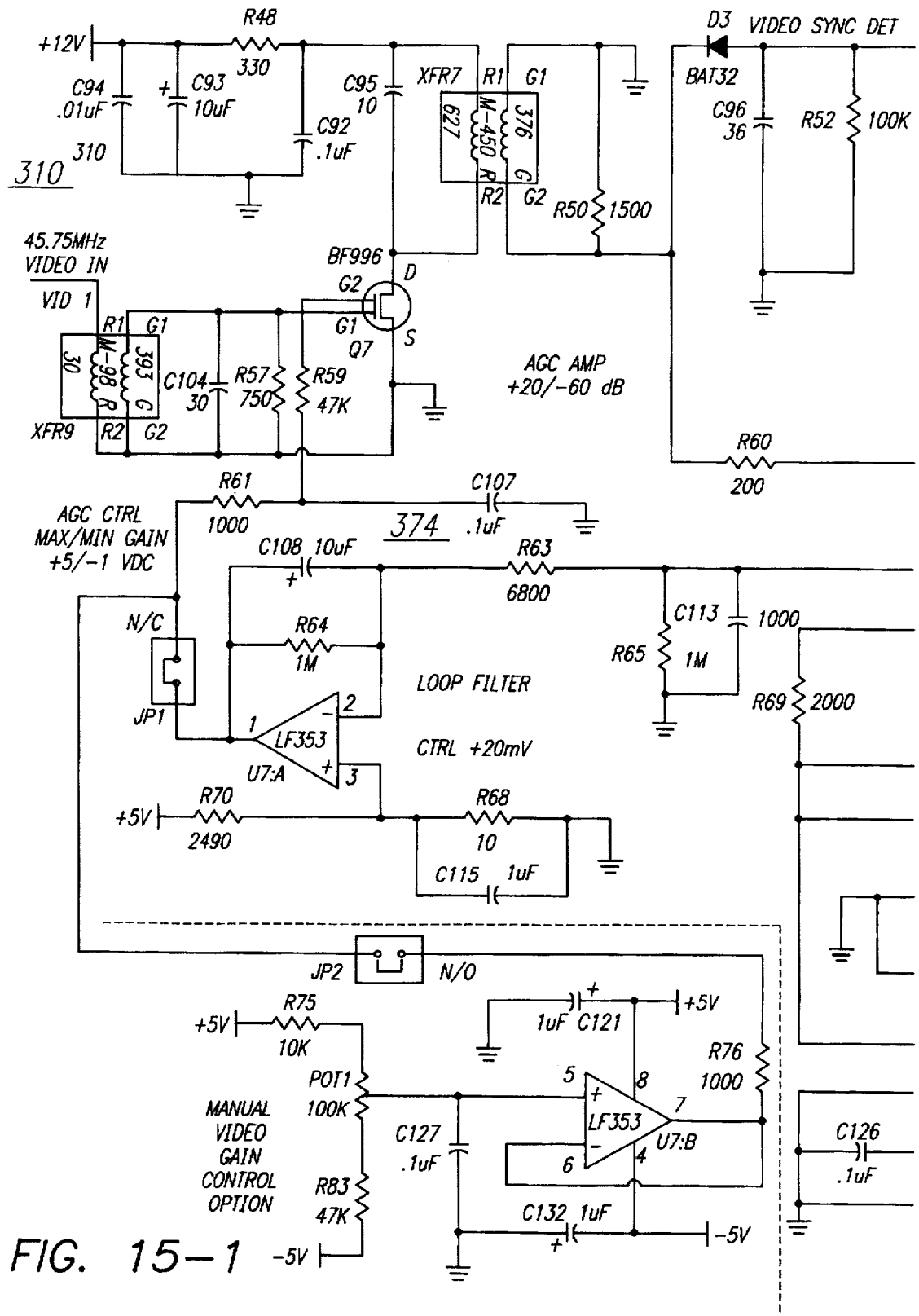
Figures 2, 15:
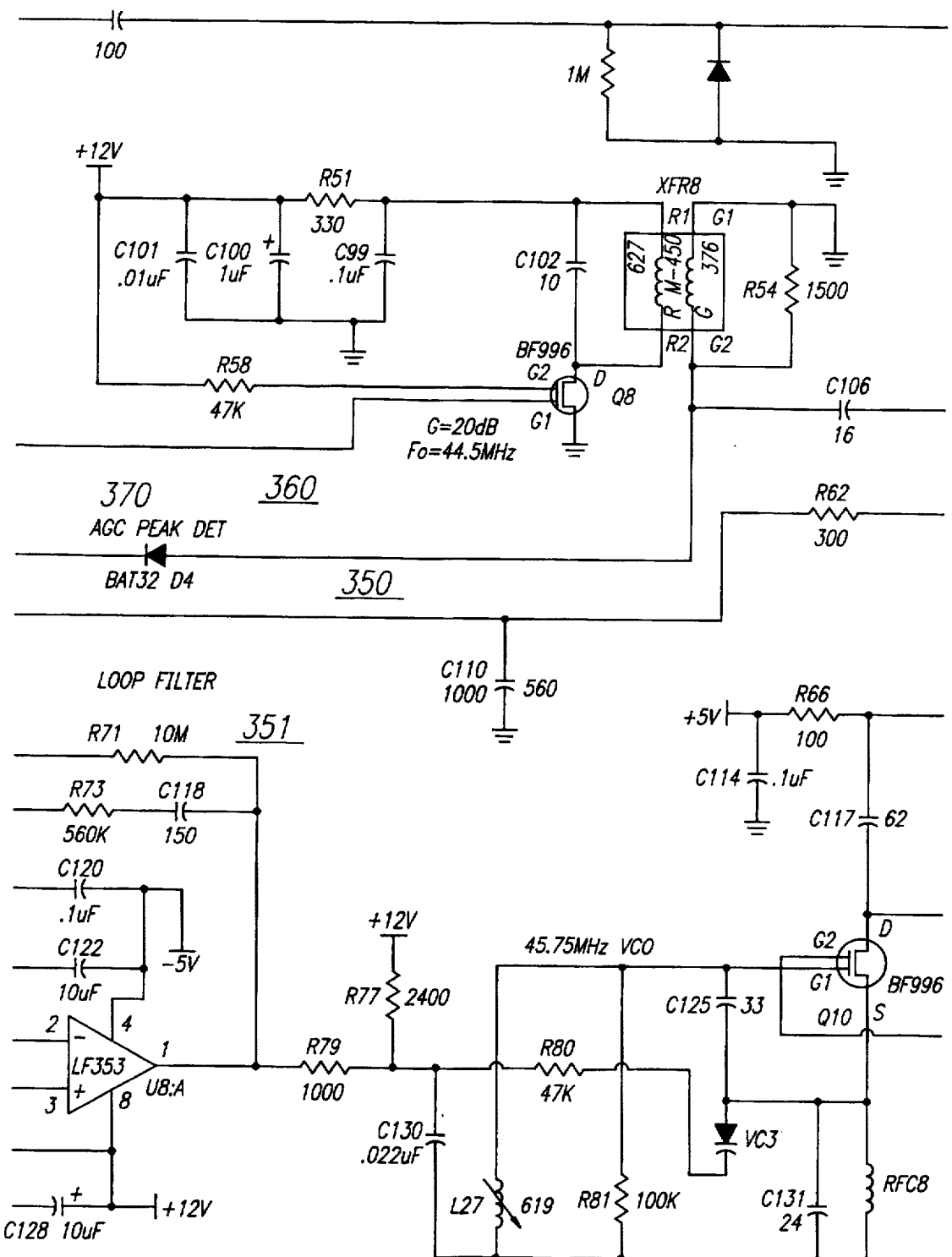
Figures 3, 15:
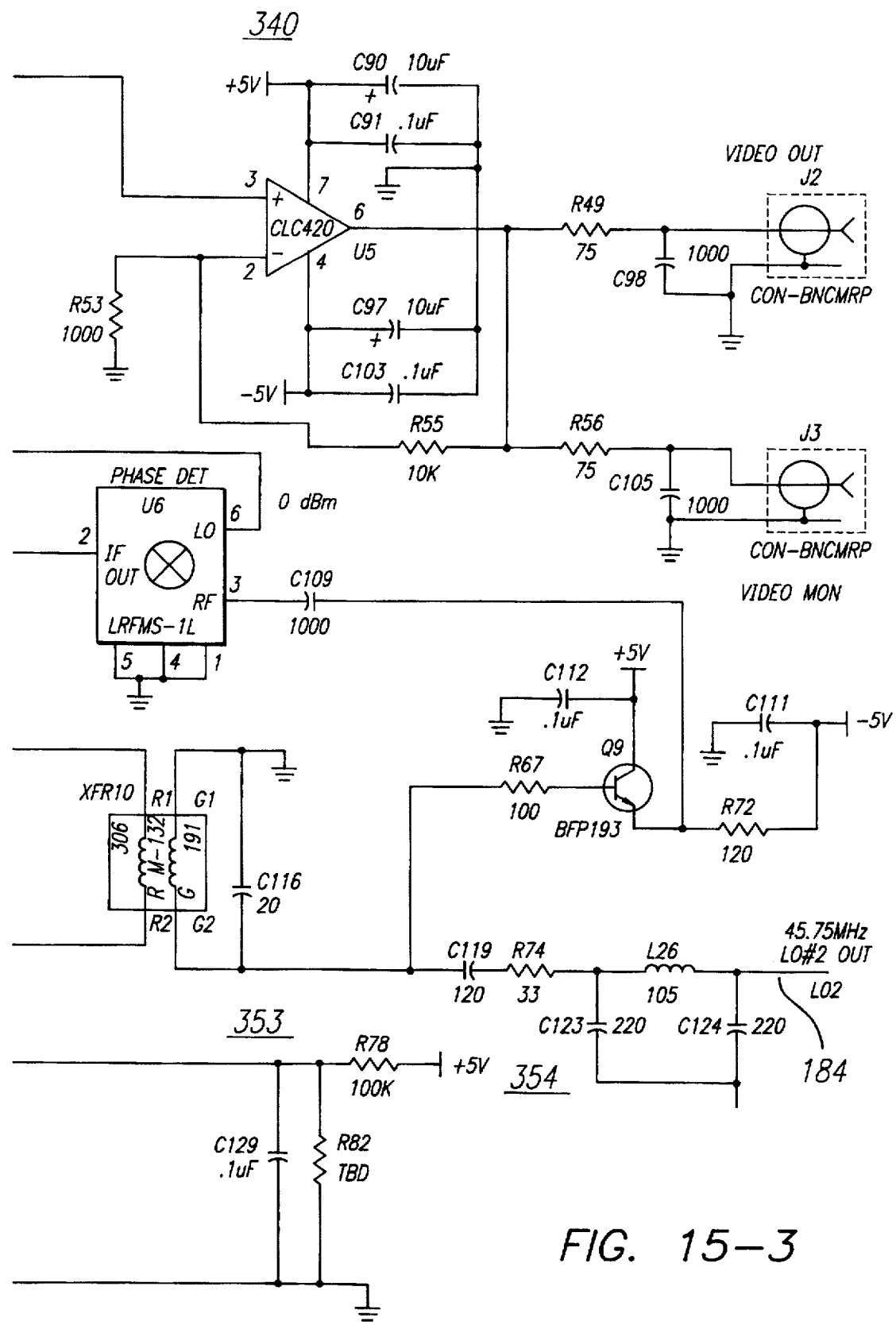
Figure 16:
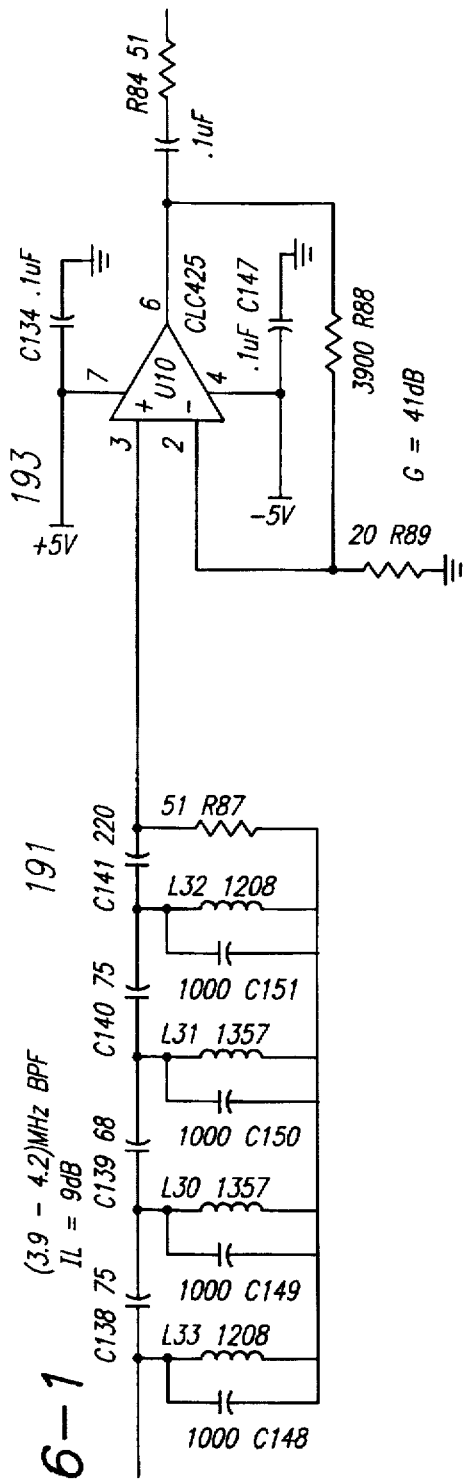
Figure 1:
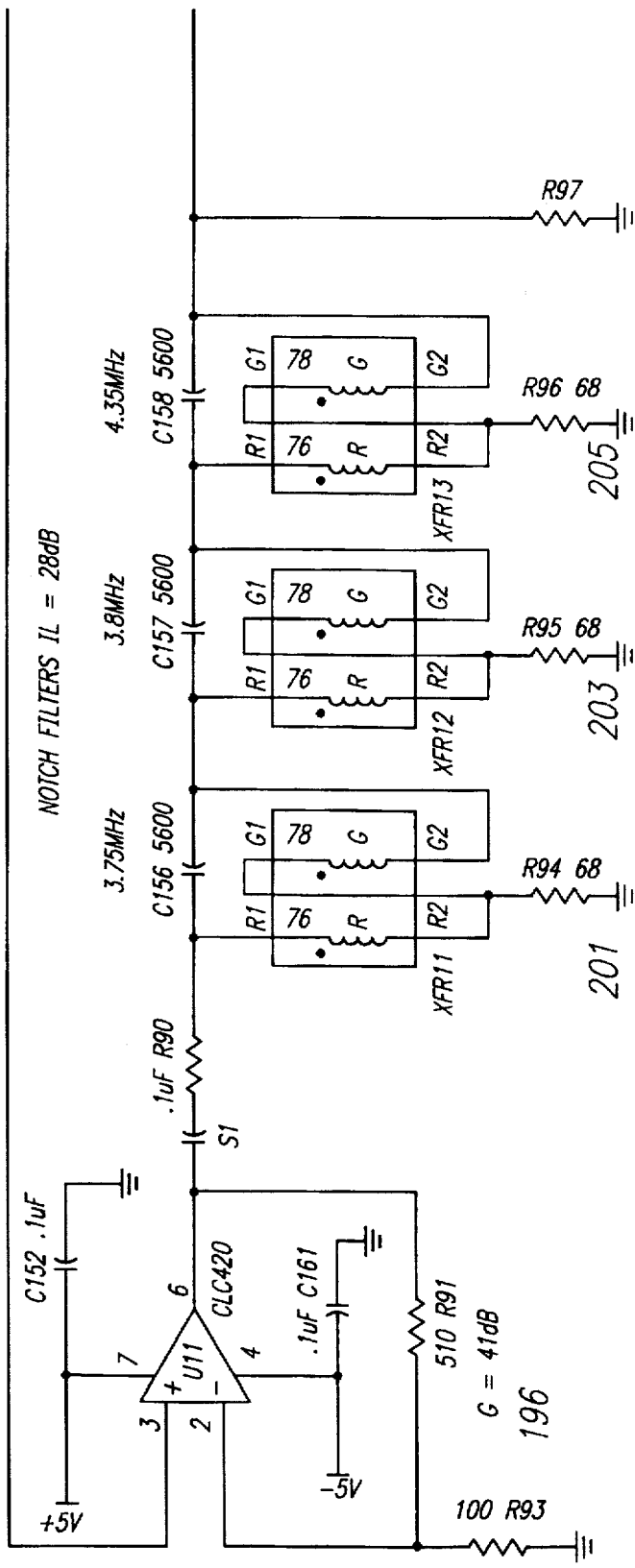
Figures 2, 16:
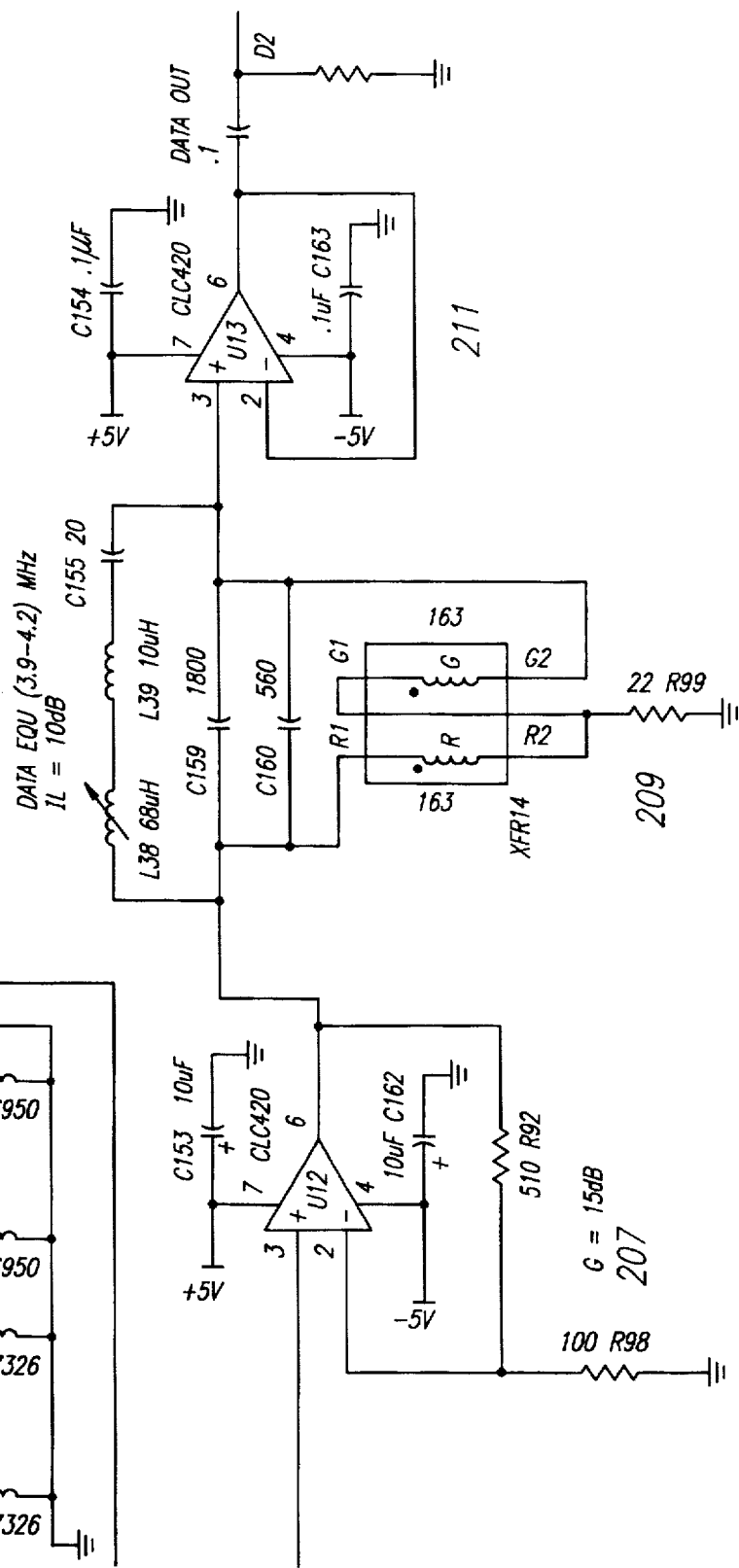
Figures 1, 17:
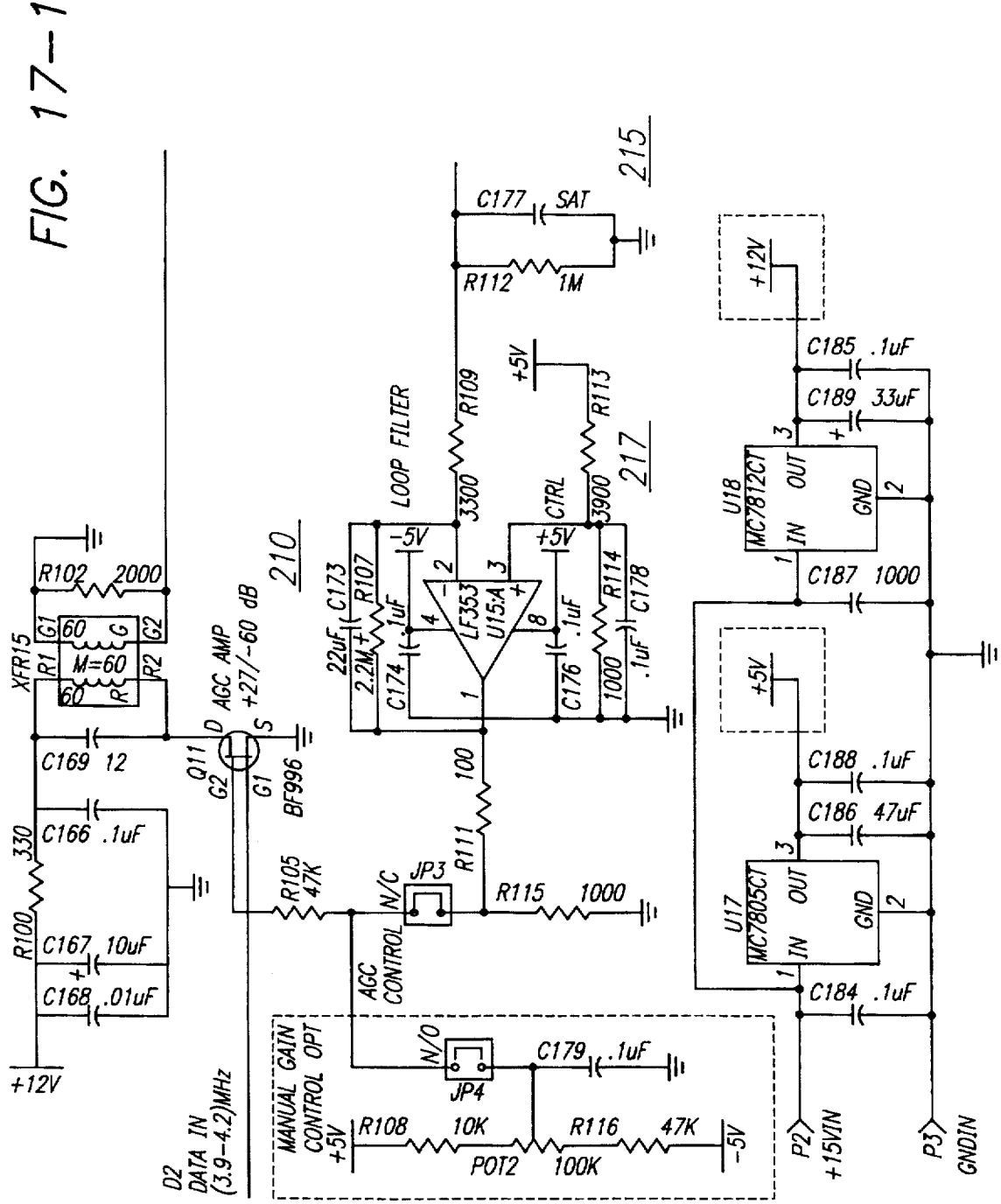
Figures 2, 17:
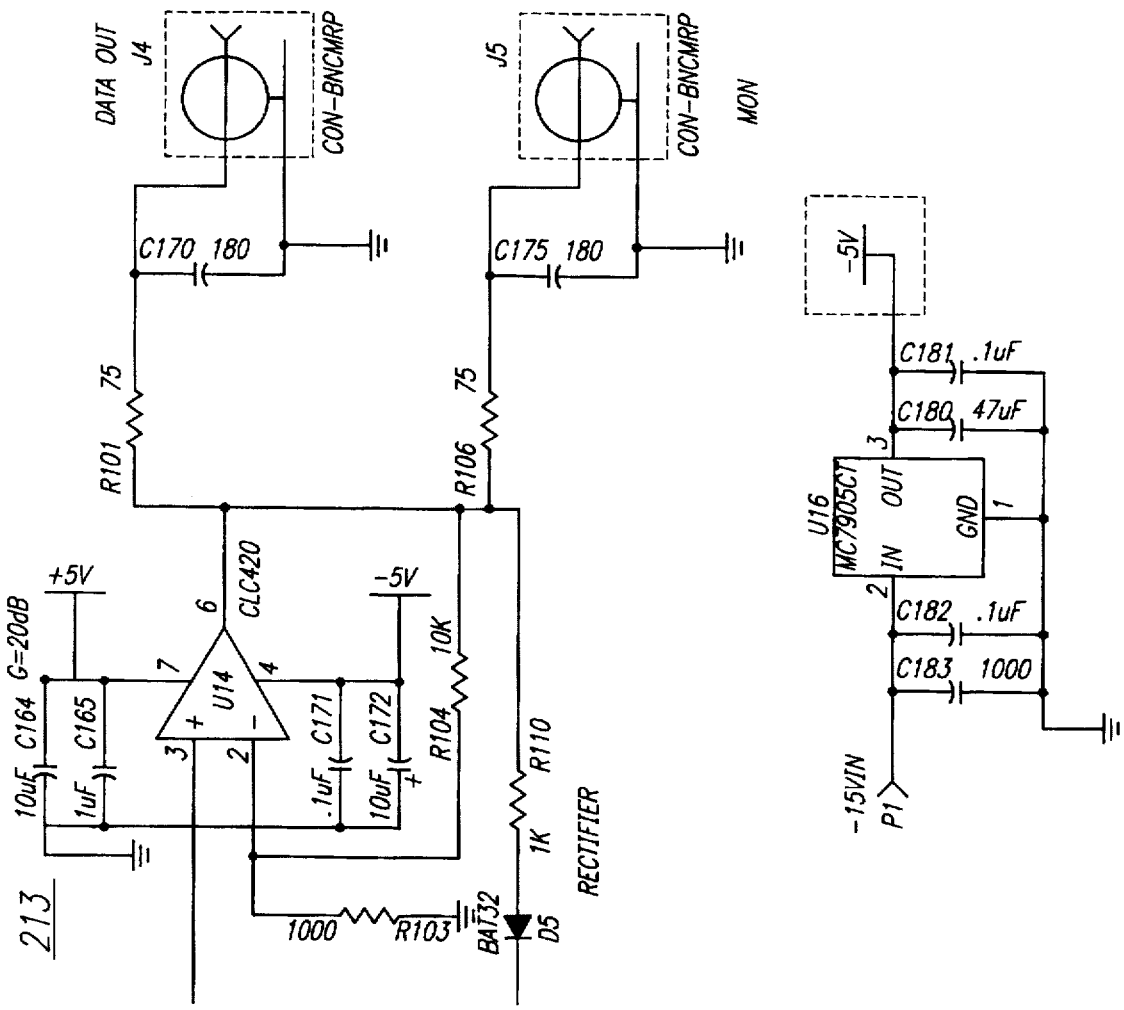

Diplexer/splitter 150, shown in FIG. 14, is coupled to the output of the mixer 140 at IF1 and comprises the following components, as shown in Table 6:

TABLE 6

| Resistor R35 | 51 Ω |
|---|---|
| Capacitor C64 | 56 pF |
| Inductor L20 | 244 nH |
| Inductor L16 | 415 nH |
| Capacitor C60 | 33 pF |

The splitter comprises a TDC-10-1 directional coupler. The next stage of the video data path is the data band pass filter 160, which is comprised of the following components, as shown in Table 7:

TABLE 7

| Capacitor C71 | 1.3 pF |
|---|---|
| Capacitor C72 | 0.9 pF |
| Capacitor C73 | 1.3 pF |
| Capacitor C74 | 10 pF |
| Capacitor C75 | 10 pF |
| Capacitor C81 | 100 pF |
| Capacitor C82 | 39 pF |
| Capacitor C83 | 100 pF |
| Capacitor C84 | 33 pF |
| Capacitor C85 | 100 pF |
| Capacitor C86 | 39 pF |
| Capacitor C87 | 100 pF |
| Capacitor C88 | 33 pF |
| Inductor L23 | 100 nH |
| Inductor L24 | 100 nH |
| Inductor L21 | 100 nH |
| Inductor L22 | 100 nH |

Data IF amp 170, which is designed to have particularly linear characteristics, comprises the following components, as shown in Table 8:

TABLE 8

| Resistor R36 | 20 Ω |
|---|---|
| Resistor R37 | 100 Ω |
| Resistor R38 | 910 Ω |
| Resistor R42 | 6800 Ω |
| Resistor R45 | 4.3 Ω |
| Resistor R46 | 3000 Ω |
| Resistor R47 | 68 Ω |
| Capacitor C67 | .1 uF |
| Capacitor C68 | 1000 pF |
| Capacitor C69 | .1 uF |
| Transistor Q6 | BFP193 |
| Capacitor C89 | .1 uF |
| Capacitor C70 | 1000 pF |
| Transformer XFR6 | Bifiler |

The second balanced mixer 180, which receives the local oscillator output LO2 (FIG. 15) at LO IN, comprises the following components, as shown in Table 9:

TABLE 9

| Isolation Transformer XFR5 | Bifiler |
|---|---|
| Filter Resistor R34 | 51 Ω |
| Resistor R40 | 200 Ω |
| Resistor R41 | 330 Ω |
| Resistor R44 | 1200 Ω |
| Resistor R43 | 200 Ω |
| Resistor R39 | 51 Ω |
| Isolation Transformer XFR4 | Bifiler |
| Filter Capacitor C65 | .01 uF |
| Capacitor C76 | .1 uF |
| Capacitor C77 | .1 uF |
| Capacitor C78 | 1000 pF |
| Capacitor C79 | .1 uF |
| Capacitor C80 | .1 uF |
| Mixer Integrated Circuit | SL6440C |

The data band pass filter 191 (FIG. 16) in filter assembly 190 is coupled via capacitor C137 to the output D1 of the mixer 180 (FIG. 14) and comprises the following components, as shown in Table 10:

TABLE 10

| Capacitor C137 | 220 pF |
|---|---|
| Capacitor C148 | 1000 pF |
| Capacitor C149 | 1000 pF |
| Capacitor C150 | 1000 pF |
| Capacitor C151 | 1000 pF |
| Capacitor C138 | 75 pF |
| Capacitor C139 | 68 pF |
| Capacitor C140 | 75 pF |
| Capacitor C141 | 220 pF |
| Inductor L33 | 1208 nH |
| Inductor L30 | 1357 nH |
| Inductor L31 | 1357 nH |
| Inductor L32 | 1208 nH |
| Resistor R87 | 51 Ω |

Amplifier 193 comprises the following components, as shown in Table 11:

TABLE 11

| Operational Amplifier | CLC 425 |
|---|---|
| Power Supply Filter Capacitor C134 | .1 uF |
| Power Supply Filter Capacitor C147 | .1 uF |
| Feedback Resistor R88 | 3900 Ω |
| Resistor R89 | 20 Ω |

Chroma band stop filter 195 is coupled by a 0.1 uF isolation capacitor and resistor R89 (51 Ω) to amplifier 193 and comprises the following components, as shown in Table 12:

TABLE 12

| Capacitor C135 | .01 uF |
|---|---|
| Capacitor C143 | 270 pF |
| Capacitor C144 | 270 pF |
| Inductor L34 | 7326 nH |
| Inductor L35 | 7326 nH |
| Inductor L28 | 198 nH |

The audio band stop filter 197 is coupled to amplifier 196 by a 0.1 uF isolation capacitor and resistor R90 (51 Ω), and comprises the following components, as shown in Table 13:

TABLE 13

| | |
|---|---|
| Capacitor C136 | .01 uF |
| Capacitor C145 | 180 pF |
| Capacitor C146 | 180 pF |
| Inductor L36 | 6950 nH |
| Inductor L37 | 6950 nH |
| Impedance Matching Resistor R86 | 100 Ω |

Amplifier 196 comprises the following components, as shown in Table 14:

TABLE 14

| | |
|---|---|
| Capacitor C152 | .1 uF |
| Capacitor C161 | .1 uF |
| Feedback Resistor R91 | 510 Ω |
| Resistor R93 | 100 Ω |
| Optional DC Isolation Capacitor (shown in Phantom) | .1 uF |
| Output Impedance Matching Resistor R90 | 51 Ω |

The 3.75 MHz notch filter 201 comprises the following components, as shown in Table 15:

TABLE 15

| | |
|---|---|
| Capacitor C156 | 5600 pF |
| Bifiler Inductors in Transformer XFR11 | 78 nH (both) |
| Resistor R94 | 68 Ω |

The components of the 3.8 MHz notch filter 203 are as follows:

TABLE 16

| | |
|---|---|
| Capacitor C157 | 5600 pF |
| Bifiler Inductors in Transformer XFR12 | 78 nH (both) |
| Resistor R95 | 68 Ω |

The components of the 4.35 MHz notch filter 205 are as follows:

TABLE 17

| | |
|---|---|
| Capacitor C158 | 5600 pF |
| Bifiler Inductors in Transformer XFR13 | 78 nH (both) |
| Resistor R96 | 68 Ω |

These are followed by impedance matching resistor R97 of 51 ohms.

Although it should be noted that the component values for all three notch filters are the same, the inductances are adjusted during testing to obtain the desired values. As part of the adjustment, the slopes of the group delay characteristic of each of the filters is altered to obtain a substantially flat (or equal) group delay response in the data bandwidth of the filter assembly 190.

The gain amplifier stage 207 comprises the following components, as shown in Table 18:

TABLE 18

| | |
|---|---|
| Operational Amplifier | CLC420 |
| Capacitor C153 | 10 uF |
| Capacitor C162 | 10 uF |

TABLE 18-continued

| | |
|---|---|
| Feedback Resistor R92 | 510 Ω |
| Resistor R98 | 100 Ω |

The data equalizer 209 comprises the following components, as shown in Table 19:

TABLE 19

| | |
|---|---|
| Adjustable Inductor L38 | 68 nH (maximum) |
| Inductor L39 | Selected to meet specification |
| Capacitor C155 | 20 pF |
| Capacitor C159 | 1800 pF |
| Capacitor C160 | 560 pF |
| Inductors in Transformer XFR14 | 163 nH (both) |
| Resistor R99 | 22 Ω |

The output stage comprises a buffer amplifier 211 of the following components, as shown in Table 20:

TABLE 20

| | |
|---|---|
| Operational Amplifier | CLC420 |
| Capacitor C154 | .1 uF |
| Capacitor C163 | .1 uF |
| Optional Coupling Capacitor (shown in Phantom) | .1 uF |
| Optional Output Load Resistor (shown in Phantom) | Selected during manufacture if needed to meet the design specification |

The automatic gain control amplifier 200 is coupled at D2 to the output D1 of the buffer amplifier 211 and comprises the following components, including amplifier 210:

TABLE 21

| | |
|---|---|
| Capacitor C168 | .01 uF |
| Capacitor C167 | 10 uF |
| Capacitor C166 | .1 uF |
| Capacitor C169 | 12 pF |
| Resistor R100 | 330 Ω |
| Field Effect Transistor Q11 | BF996 |
| Inductors in Transformer XFR15 | 60 nH (both) with mutual inductive coupling of 60 |
| Resistor R105 | 47 KΩ |

The output of the amplifier 211 is coupled to an operational amplifier 213 configured for impedance matching, and is comprised of the following components:

TABLE 22

| | |
|---|---|
| Operational Amplifier | CLC420 |
| Capacitor C164 | 10 uF |
| Capacitor C165 | .1 uF |
| Capacitor C171 | .1 uF |
| Capacitor C172 | 10 uF |
| Resistor R104 | 10 KΩ |
| Resistor R103 | 1000 Ω |
| Output Resistor R101 | 75 Ω |
| Isolation Capacitor C170 | 180 pF |
| Output Resistor R106 | 75 Ω |
| Isolation Capacitor C175 | 180 Ω |

The rectifier circuit 215, which is coupled to the output amplifier of the AGC amplifier 202, is comprised of the following components, as shown in Table 23:

TABLE 23

| Resistor R110 | 1000 Ω |
|---|---|
| Diode D5 | BAT32 |
| Capacitor C177 | Selected to meet specification |
| Resistor R112 | 1 MΩ |

The loop filter 217 of the AGC amplifier 202 is coupled to the output of the rectifier circuit for providing the gain control signal to gate G2 of the field effect transistor Q11, and is comprised of the following components, as shown in Table 24:

TABLE 24

| Input Resistor R109 | 3300 Ω |
|---|---|
| Operational Amplifier | LF353 |
| Capacitor C174 | .1 uF |
| Capacitor C173 | 22 uF |
| Capacitor C176 | .1 uF |
| Capacitor C178 | .1 uF |
| Resistor R107 | 2.2 MΩ |
| Resistor R113 | 3900 Ω |
| Resistor R114 | 1000 Ω |
| Resistor R111 | 100 Ω |

The output of the loop filter is coupled through a voltage divider comprised of resistor R115 of 1000 ohms, jumper JP3 and resistor R105 of 47,000 ohms, to provide the automatic gain control to the output AGC amplifier 200. Alternatively, manual gain control may be obtained by opening jumper JP3 and closing jumper JP4, which is coupled to a 0.1 microfarad filter capacitor to ground and a voltage divider comprised of resistor R108 of 10,000 ohms, potentiometer POT02 of 100K ohms and resistor R116 of 47,000 ohms.

The video path comprises the following sections, starting with video band pass filter 300 (FIG. 14) comprising the following components in Table 25:

TABLE 25

| Capacitor C56 | 16 pF |
|---|---|
| Capacitor C61 | 120 pF |
| Inductor L17 | 89 nH |
| Capacitor C58 | 5.6 pF |
| Capacitor C62 | 120 pF |
| Inductor L19 | 95 nH |
| Capacitor C59 | 5.6 pF |
| Capacitor C63 | 120 pF |
| Inductor L18 | 89 nH |
| Capacitor C57 | 16 pF |

AGC amplifier 310 is coupled at VID1 to the filter 300 and is comprised of the following components:

TABLE 26

| Inductors in Input Transformer XFR9 | 39 nH (both) |
|---|---|
| Capacitor C104 | 30 pF |
| Resistor R57 | 750 Ω |
| Resistor R59 | 47 KΩ |
| Field Effect Transistor Q7 | BF996 |
| Capacitor C94 | .01 uF |
| Capacitor C93 | 10 uF |
| Resistor R48 | 330 Ω |
| Capacitor C92 | .01 uF |
| Capacitor C95 | 10 pF |
| Input Inductor in Isolation Transformer XFR7 | 627 nH |
| Output Inductor in Isolation Transformer XFR7 | 376 nH |
| Transformer XFR7 Output Impedance Resistor R50 | Mutual Inductive Coupling 450 1500 Ω |

The video sync detect comprises the following components, as shown in Table 27:

TABLE 27

| Diode D3 | BAT32 |
|---|---|
| Capacitor C96 | 36 pF |
| Resistor R52 | 100 KΩ |

Amplifier 360 comprises the following components:

TABLE 28

| Resistor R60 | 220 Ω |
|---|---|
| Resistor R58 | 47 KΩ |
| Field Effect Transistor Q8 | BF996 |
| Capacitor C99 | .1 pF |
| Resistor R51 | 330 Ω |
| Capacitor C101 | .01 uF |
| Capacitor C100 | 1 uF |
| Capacitor C102 | 10 pF |
| Input Inductor in Isolation Transformer XFR8 | 627 nH |
| Output Inductor in Isolation Transformer XFR8 | 376 nH |
| Isolation Transformer XFR8 | Mutual Inductive Coupling 450 |
| Resistor R54 | 1500 MΩ |
| Optional Isolation Capacitor (shown in Phantom) | 100 pF |
| Optional Diode Clamp Resistor (shown in Phantom) | 1 MΩ |
| Optional Diode Clamp Diode (shown in Phantom) | BAT32 |

An output of the video sync detect, coupled by an optional 100 uF coupling capacitor, 1 MΩ resistor and diode, is amplified by amplifier 340 (for a cleaner signal at the video output) by the following components:

TABLE 29

| Operational Amplifier | CLC420 |
|---|---|
| Capacitor C90 | 10 uF |
| Capacitor C91 | .1 uF |
| Resistor R49 | 75 Ω |
| Capacitor C97 | 10 pF |
| Capacitor C103 | .1 uF |
| Feedback Resistor R55 | 10 KΩ |
| Resistor R53 | 1000 Ω |
| Output Resistor R56 | 75 Ω |
| Capacitor C98 | 1000 pF |
| Capacitor C105 | 1000 pF |

The output of the amplifier 310 is coupled by capacitor C106 to the input of the phase detector U6, which may be a LRFMS-1L. The IF output of the phase detector is coupled through a 300 ohm resistor R62 and high frequency output filter C110, which is a 1000 picofarad capacitor, to the loop filter of the circuit. The loop filter 351 of the circuit comprises the following components:

TABLE 30

| Resistor R69 | 2000 Ω |
|---|---|
| Resistor R71 | 10 MΩ |

TABLE 30-continued

| Resistor R73 | 560 KΩ |
|---|---|
| Capacitor C118 | 150 pF |
| Capacitor C120 | .1 uF |
| Capacitor C122 | 10 uF |
| Operational Amplifier | LF353 |
| Capacitor C126 | .1 uF |
| Capacitor C128 | 10 uF |
| Output Resistor R79 | 1000 Ω |

The output of the loop filter, which is a second order Type 1 of Type 2 filter, is then coupled to the voltage controlled oscillator 353 of the local oscillator 350, comprised of the following components:

TABLE 31

| Resistor R77 | 2400 Ω |
|---|---|
| Capacitor C130 | .022 uF |
| Adjustable Inductor L27 | 1690 nH |
| Resistor R80 | 47 KΩ |
| Resistor R81 | 100 KΩ |
| Veractor VC3 | Siemens BB535 |
| Capacitor C131 | 24 pF |
| RFC8 (Choke 8) | A 10 KΩ toroidal bead at the local oscillator frequency |
| Capacitor C125 | 33 pF |
| Field Effect Transistor Q10 | BF996 |
| Capacitor C129 | .1 pF |
| Resistor R82 | Selected to meet specification |
| Resistor R78 | 100 KΩ |
| Capacitor C117 | 62 pF |
| Capacitor C114 | .1 uF |
| Resistor R66 | 100 Ω |
| Isolation Transformer XFR10 | 306 nH and 191 nH coils with a mutual inductive coupling of 123 |
| Filter Capacitor C116 | 20 pF |

The output of the voltage controlled oscillator is coupled through a filter 354 comprised of the following components to provide the local oscillator output 184 at LO2:

TABLE 32

| Capacitor C119 | 120 Ω |
|---|---|
| Resistor R74 | 33 Ω |
| Capacitor C123 | 220 pF |
| Capacitor C124 | 220 pF |
| Inductor L26 | 105 nH |

The output of the voltage controlled oscillator is also coupled to the RF input of the phase detector U6 for the local oscillator 350. The coupling is done by the following components:

TABLE 33

| Resistor R67 | 100 Ω |
|---|---|
| Transistor Q9 | BFP193 |
| Capacitor C112 | .1 uF |
| Resistor R72 | 120 Ω |
| Capacitor C111 | .1 uF |
| Capacitor C109 | 1000 pF |

The output of the amplifier 360 is also coupled to an AGC peak detector 370 for providing the AGC amplitude control to the control mode at gate G2, at transistor Q7. The circuitry for the AGC peak detector is comprised of the following components:

TABLE 34

| Diode D4 | BAT32 |
|---|---|
| Capacitor C113 | 1000 pF |
| Resistor R63 | 6800 Ω |
| Resistor R68 | 10 Ω |
| Capacitor C115 | 1 uF |
| Capacitor C108 | 10 uF |
| Operational Amplifier | LF353 |
| Resistor R61 | 1000 Ω |
| Resistor R70 | 2490 Ω |

The loop filter 374 for the automatic gain control amplifier comprises the following components, as shown in Table 35:

TABLE 35

| Resistor R63 | 6800 Ω |
|---|---|
| Capacitor C108 | 10 uF |
| Resistor R64 | 1 MΩ |
| Operational Amplifier | LF353 |
| Resistor R70 | 2490 Ω |
| Resistor R68 | 10 Ω |
| Capacitor C115 | 1 uF |

The output of this loop filter is coupled through resistor R61 to the control gate G2 through resistor R59.

Alternatively, manual video gain control can be provided through a voltage divider comprised of the following components, as shown in Table 36.

TABLE 36

| Resistor R75 | 10 KΩ |
|---|---|
| Resistor R83 | 47 KΩ |
| Potentiometer POT1 | 100 KΩ | and then coupled through jumper JP2 by isolation, a buffer amplifier comprised of the following components:

TABLE 37

| Capacitor C127 | .1 uF |
|---|---|
| Capacitor C132 | .1 uF |
| Operational Amplifier | LF353 |
| Capacitor C121 | 1 uF |
| Resistor R76 | 1000 Ω |

Although the specific embodiment discussed above is for an NTSC tuner specifically designed to receive a signal in the Channel 12 band, it will be understood by those of skill in the field that other channels and other video signal formats may be readily used. For receiving other channels, the center frequencies of the filters, amplifiers and attenuators and the frequency of the local oscillator will have to be changed to the frequency of the desired channel. It would also be possible to alter the input section of the tuner comprised of filter 100, amplifier 110, filter 120, attenuator 130, modulator 140 and local oscillator 158 to provide a tuner that can tune to multiple channels.

For video signals in PAL, SECAM or other similar formats, the frequencies of the filters in the data path would need to be modified to accommodate the data bandwidth in those video formats. Further, it would be readily apparent to those of skill in the field that a different intermediate frequency may be selected. Of course, in providing for such different frequencies, the component values would have to be changed. It is yet also further understood that although the filtering function performed by the filtering assembly 190 is done in the video base band, this filtering could also be done in the intermediate frequency band. Other alternate embodiments would also be readily apparent such as doing the filtering digitally with digital signal filtering, and separating the video sync or the data band at IF or at the transmission frequency. Obviously, the order of certain components can also be switched such as chroma and audio filters 195, 197 and notch filters 201, 203 and 205. Of course, the scope of the invention should be measured by the claims.

We claim:

1. In a method for receiving a color video signal by shifting a received video signal transmitted in a frequency range other than base band, wherein the received video signal includes a luminance portion having a luminance bandwidth and may include a data portion injected into the video by a data carrier having a data bandwidth, the improvement comprising:

splitting the video signal to provide a data signal including the data bandwidth, and a luminance signal having at least part of the luminance bandwidth;

filtering the data signal with a filter having a band pass comprising the data bandwidth to produce a filtered data signal;

generating a data carrier with the luminance signal; and shifting the filtered data signal to a lower frequency with the generated data carrier.

2. In the method of claim 1, wherein the data portion of the received filtering has a data bandwidth with an upper and lower frequencies, the filtering further comprises:

band pass filtering the received signal with a filter having a band pass approximately equal to the data bandwidth to produce a band pass filtered data signal.

3. In the method of claim 2, the method further including notch filtering the band pass filtered data signal to produce an improved data signal.

4. In the method of claim 3, wherein the notch filtering is done at a frequency approximately equal to at least one of the upper and lower frequencies.

5. In the method of claim 3, wherein the video signal also has an audio portion occupying an audio bandwidth different from the bandwidth of the data portion, wherein the method includes band stop filtering in the audio bandwidth.

6. In the method of claim 5, wherein the frequency of the notch filtering is approximately equal to both of the upper and lower limits of the bandwidth.

7. In the method of claim 1, wherein the method further comprises shifting the received video signal to an intermediate frequency before splitting the signal.

8. In the method of claim 7, wherein the method further comprises shifting of the filtered data signal to a lower frequency.

9. A tuner for a combined signal containing a data portion injected into the active portion of the video signal having blanking intervals and lumina and chroma portions, the tuner comprising:

an input adapted for receiving a video signal in a particular channel;

data path means for separating the data portion from the combined signal;

video path means for providing a sync signal based upon the blanking intervals, the video path means generating a lumina signal having at least part of the lumina portion at an intermediate frequency; and a local oscillator in phase lock with the lumina signal.

10. The tuner of claim 9, wherein the data path generates a data IF signal including the data portion of the signal; and the data path further includes a mixer for shifting the data IF signal to a lower frequency.

11. The tuner of claim 10, wherein the data was injected into the video signal in a data video base band bandwidth, and the mixer shifts the data IF signal to the data video base band bandwidth.

12. The tuner of claim 10, wherein the data has a base bandwidth before being injected into the video signal, wherein the mixer shifts the data IF signal to a bandwidth above the base band of the data signal.

13. The tuner of claim 9, wherein the tuner comprises:

an input means adapted for receiving a video input signal in an assigned channel band;

an automatic controlled attenuator responsive to the input signal to produce an attenuated output signal; and a mixer responsive to the attenuator output signal to shift the received video signal to an intermediate frequency band, wherein the output of the mixer is coupled to the data and the video paths.

14. The tuner of claim 13, wherein the automatic controlled attenuator has the amount of attenuation set to avoid third order intermodulation interference with the data portion for relatively strong signals.

15. The tuner of claim 13, wherein the automatic controlled attenuator is responsive to the attenuated output signal to control the output of the attenuator to avoid third order interference in the mixer.

* * * * *